United States Patent
Fukuoka et al.

(12)

(10) Patent No.: US 10,578,063 B2
(45) Date of Patent: Mar. 3, 2020

(54) RELIEF VALVE AND FUEL SUPPLYING SYSTEM

(71) Applicants: DENSO CORPORATION, Kariya, Aichi-pref. (JP); KYOSAN DENKI CO., LTD., Koga, Ibaraki-pref. (JP)

(72) Inventors: Shingo Fukuoka, Kariya (JP); Hideto Takahashi, Kariya (JP); Hiromi Sakai, Kariya (JP); Minoru Edura, Koga (JP)

(73) Assignees: DENSO CORPORATION, Kariya (JP); KYOSAN DENKI CO., LTD., Koga (JP)

( * ) Notice: Subject to any disclaimer, the term of this patent is extended or adjusted under 35 U.S.C. 154(b) by 137 days.

(21) Appl. No.: 15/512,935

(22) PCT Filed: Sep. 8, 2015

(86) PCT No.: PCT/JP2015/004567
§ 371 (c)(1),
(2) Date: Mar. 21, 2017

(87) PCT Pub. No.: WO2016/047065
PCT Pub. Date: Mar. 31, 2016

(65) Prior Publication Data
US 2017/0292481 A1    Oct. 12, 2017

(30) Foreign Application Priority Data
Sep. 25, 2014   (JP) ................ 2014-195483

(51) Int. Cl.
*F02M 37/00*       (2006.01)
*F02M 37/08*       (2006.01)
(Continued)

(52) U.S. Cl.
CPC ........ *F02M 37/0023* (2013.01); *F02M 37/00* (2013.01); *F02M 37/0029* (2013.01);
(Continued)

(58) Field of Classification Search
CPC .... F02M 37/00; F02M 37/08; F02M 37/0023; F02M 37/106; F16K 15/026; F16K 17/04
(Continued)

(56) References Cited

U.S. PATENT DOCUMENTS

| | | | |
|---|---|---|---|
| 5,778,926 A * | 7/1998 | Tanaka | B01D 35/027 137/508 |
| 2012/0180649 A1* | 7/2012 | Hishinuma | F04B 1/0452 91/435 |
| 2013/0306033 A1 | 11/2013 | Kato et al. | |

FOREIGN PATENT DOCUMENTS

JP    H01-66500    3/1989

* cited by examiner

*Primary Examiner* — Stephen K Cronin
*Assistant Examiner* — Omar Morales
(74) *Attorney, Agent, or Firm* — Nixon & Vanderhye PC

(57) ABSTRACT

A valve element includes: a loosely insertable wall portion that is loosely inserted in an inside of a connecting portion on a downstream side of a valve seat; a fittable tubular portion that is fitted to the inside of the connecting portion on a downstream side of the loosely insertable wall portion; and a projecting annular portion that projects from the fittable tubular portion toward a radially inner side of the fittable tubular portion. An outlet portion projects into the fittable tubular portion. A valve spring is located on a radially outer side of the outlet portion and on the radially inner side of the fittable tubular portion to urge the valve element toward the valve seat.

8 Claims, 12 Drawing Sheets

(51) Int. Cl.
*F16K 17/04* (2006.01)
*F16K 15/02* (2006.01)
*F16K 47/02* (2006.01)
*F02M 37/10* (2006.01)

(52) U.S. Cl.
CPC .......... *F02M 37/08* (2013.01); *F16K 15/026* (2013.01); *F16K 17/04* (2013.01); *F16K 47/02* (2013.01); *F02M 37/0011* (2013.01); *F02M 37/106* (2013.01)

(58) Field of Classification Search
USPC ........................................................ 123/446
See application file for complete search history.

RELIEF VALVE AND FUEL SUPPLYING SYSTEM

CROSS REFERENCE TO RELATED APPLICATION

This application is the U.S. national phase of International Application No. PCT/JP2015/004567 filed on Sep. 8, 2015 and is based on and incorporates herein by reference Japanese Patent Application No. 2014-195483 filed on Sep. 25, 2014.

TECHNICAL FIELD

The present disclosure relates to a relief valve for a fuel supplying system, in which fuel is pumped from a fuel pump to an internal combustion engine to supply the fuel to the internal combustion engine, while the relief valve releases a pressure of supply fuel, which is directed to the internal combustion engine, to an outside. The present disclosure also relates to the fuel supplying system that includes the relief valve.

BACKGROUND ART

A relief valve of a fuel supplying system disclosed in, for example, the patent literature 1 is known.

Specifically, in the structure disclosed in the patent literature 1, an inlet portion receives the fuel, which is branched from a supply flow of the fuel directed to the internal combustion engine, and an outlet portion outputs the fuel, which is inputted into the inlet portion, to the outside. The inlet portion and the outlet portion are connected with each other through a connecting portion. A valve element (in the patent literature 1, a combination of a valve body and a movable holder), which is received in an inside of the connecting portion, is seated and lifted relative to a valve seat, which is formed in the inlet portion and is located on an upstream side of the valve element, in a state where the valve element is urged toward the valve seat by a resilient member. Here, a valve opening pressure for opening the valve element away from the valve seat is determined according to a resiliency characteristic that is preset at the resilient member. Therefore, at the valve closing time, the pressure of the supply fuel directed toward the internal combustion engine side becomes lower than the valve opening pressure, and thereby the valve element is seated against the valve seat. At this time, the fuel flow from the inlet portion to the outlet portion is blocked, so that the pressure of the fuel can be maintained. In contrast, at the valve opening time, the pressure of the supply fuel directed toward the internal combustion engine becomes equal to or larger than the valve opening pressure, and thereby the valve element is lifted away from the valve seat. At this time, the fuel flow from the inlet portion to the outlet portion is enabled, so that the pressure of the fuel can be released.

In the structure recited in the patent literature 1, a portion of the valve element, which is loosely inserted into the inside of the connecting portion on the downstream side of the valve seat, enables communication of a communication passage, which is located between the portion of the valve element and the connecting portion, to the inside of the inlet portion. The inventors of the present application have extensively studied the fuel flow, which is generated in the inside of the connecting portion at the valve opening time. As a result of the study, the inventors of the present application have found that a swirl flow of a low flow speed is generated on a downstream side of the valve element that is an opposite side of the valve element, which is opposite from the valve seat, relative to a main flow of a high flow speed that is directed from the communication passage toward the downstream side in the axial direction of the valve element. The swirl flow of the low flow speed will cause a change in a back pressure, which is applied from the downstream side to the valve element placed in the valve opening state. Therefore, it will result in chattering of the valve element, and thereby pressure pulsation is generated in the fuel. Furthermore, the inventors of the present application have also found the following phenomenon. That is, at the location between the valve element and the valve seat, at which the negative pressure is exerted in the valve opening state of the valve element, fuel vapor is generated due to the phenomenon of boiling in the vacuumed state. The thus generated vapor is carried by the main flow or the swirl flow. Thereby, the resilient member, which urges the valve element, is vibrated due to the collision of the vapor against the resilient member. The pressure pulsation and the vibration will cause generation of a noise in the path to the internal combustion engine. Therefore, it is desirable to limit the generation of the pressure pulsation and the vibration.

CITATION LIST

Patent Literature

PATENT LITERATURE 1: JP2013-241835A (corresponding to US2013/0306033A1)

SUMMARY OF INVENTION

The present disclosure is made in view of the above disadvantages, and it is an objective of the present disclosure to provide a relief valve, which reduces a noise, and a fuel supplying system having such a relief valve.

According to a first aspect of the present disclosure, there is provided a relief valve for a fuel supplying system that pumps fuel from a fuel pump to supply the fuel toward an internal combustion engine, wherein the relief valve releases a pressure of supply fuel, which is directed to the internal combustion engine, to an outside, the relief valve including: an inlet portion that receives the fuel, which is branched from a supply flow of the fuel directed to the internal combustion engine; an outlet portion that outputs the fuel, which is inputted into the inlet portion, to the outside; a connecting portion that is connected to the inlet portion and the outlet portion; a valve element that is reciprocatable toward both of an upstream side and a downstream side in an inside of the connecting portion, wherein: the valve element blocks a fuel flow from an inside of the inlet portion to an inside of the outlet portion in a valve closing state, in which the valve element is seated against a valve seat formed in the inlet portion or the connecting portion; and the valve element enables the fuel flow from the inside of the inlet portion to the inside of the outlet portion in a valve opening state, in which the valve element is lifted from the valve seat; and a resilient member that is received in the inside of the connecting portion and urges the valve element toward the valve seat, which is located on an upstream side of the valve element, wherein: the valve element includes: a loosely insertable wall portion that is loosely inserted in the inside of the connecting portion on a downstream side of the valve seat and communicates a first communication passage, which is formed between the loosely insertable wall portion and the connecting portion, to the inside of the inlet portion in the valve opening state; a fittable tubular portion that is fitted to the inside of the connecting portion on a downstream side of the loosely insertable wall portion and is slidably supported by the connecting portion; and a projecting annular portion that projects from the fittable tubular portion toward a radially inner side of the fittable tubular portion, so that a second communication passage, which is communicated with the first communication passage, is formed by the projecting annular portion to extend from a location between the projecting annular portion and the loosely insertable wall portion to a radially inner side of the projecting annular portion; the outlet portion projects into the fittable tubular portion on the radially inner side of the fittable tubular portion at a location on a downstream side of the projecting annular portion, so that the outlet portion is communicated with the second communication passage; and the resilient member is located on a radially outer side of the outlet portion and on the radially inner side of the fittable tubular portion and is engaged to the projecting annular portion located on an upstream side of the resilient member.

According to the first aspect of the present disclosure, in the valve element, which is in the valve opening state, the loosely insertable wall portion, which is loosely inserted in the inside of the connecting portion on the downstream side of the valve seat, communicates the first communication passage, which is formed between the loosely insertable wall portion and the connecting portion, to the inside of the inlet portion. At this time, on the downstream side of the loosely insertable wall portion, the second communication passage, which is communicated with the first communication passage, is formed by the projecting annular portion that projects from the fittable tubular portion, which is fitted to the inside of the connecting portion and is slidably supported by the connecting portion, toward the radially inner side of the fittable tubular portion. Thereby, a main flow, which has a high flow speed and is bent from the first communication passage toward the radially inner side, is generated as a flow of the fuel at a location between the loosely insertable wall portion and the projecting annular portion in the second communication passage. Furthermore, at this time, the inside of the outlet portion, which projects into the fittable tubular portion on the radially inner side of the fittable tubular portion, is communicated with the second communication passage on the downstream side of the projecting annular portion. Thereby, the main flow, which has the high flow speed and is bent in the above-described manner, is rectified and flows from the second communication passage, which is located on the radially inner side of the projecting annular portion, toward the outlet portion. Thus, the main flow will less likely become a swirl flow. Furthermore, the resilient member, which is located on the radially outer side of the outlet portion and the radially inner side of the fittable tubular portion and is engaged with the projecting annular portion on the upstream side of the resilient member, is displaced from the main flow, which has the high flow speed and is directed toward the inside of the outlet portion. Therefore, the vapor, which is carried by the main flow, will less likely collide against the resilient member.

As discussed above, in the relief valve according to the first aspect of the present disclosure, it is possible to limit generation of the pulsation of the fuel, which would be caused by chattering of the valve element, and it is also possible to limit generation of vibration of the resilient member. Thus, it is possible to reduce the noise, which would be caused by the pulsation and the vibration discussed above.

Furthermore, according to a second aspect of the present disclosure, the fuel, which is pumped from the fuel pump, is forcefully pressurized to a pressure that is equal to or larger than a valve opening pressure of the valve element, at which the valve element is opened, in a case where a pressure increasing condition, which corresponds to an operational state of the internal combustion engine, is satisfied.

According to the second aspect of the present disclosure, the fuel, which is pumped from the fuel pump, is forcefully pressurized to the pressure that is equal to or larger than the valve opening pressure of the valve element, at which the valve element is opened, in the case where the pressure increasing condition, which corresponds to the operational state of the internal combustion engine, is satisfied, so that the valve element is opened. At this time, the generation of the pulsation in the fuel, which is caused by the chattering of the valve element, and the vibration of the resilient member are both limited because of the above-described principle. Thereby, it is possible to avoid the generation of the noise, which is caused by the pulsation and the vibration every time the pressure increasing condition is satisfied.

Furthermore, according to a third aspect of the present disclosure, there is provided a fuel supplying system that supplies fuel toward an internal combustion engine, the fuel supplying system including: a fuel pump that pumps supply fuel toward the internal combustion engine; and the relief valve of the first aspect of the present disclosure that releases a pressure of the supply fuel, which is directed to the internal combustion engine, to the outside.

In the fuel supplying system, which has the relief valve of the first aspect of the present disclosure, according to the third aspect of the present disclosure, the generation of the pulsation in the fuel, which is caused by the chattering of the valve element, and the vibration of the resilient member are both limited because of the above-described principle. Thereby, it is possible to reduce the noise, which is caused by the pulsation and the vibration.

DESCRIPTION OF EMBODIMENTS

Various embodiments of the present disclosure will be described with reference to the drawings. In each of the following embodiments, the corresponding constituent elements are indicated by the same reference signs and may not be described redundantly for the sake of simplicity. In a case where only a portion(s) of the structure is described in each of the following embodiments, the rest of the structure may be the same as that of the previously described embodiment(s). Furthermore, in each of the following embodiments, besides the combination(s) of components of the embodiments explicitly described in the corresponding respective embodiments, other combinations of the components of the embodiments, which are not explicitly described in the embodiments, may be implemented unless there is a particular problem that hiders such combinations.

First Embodiment

Figure 1:
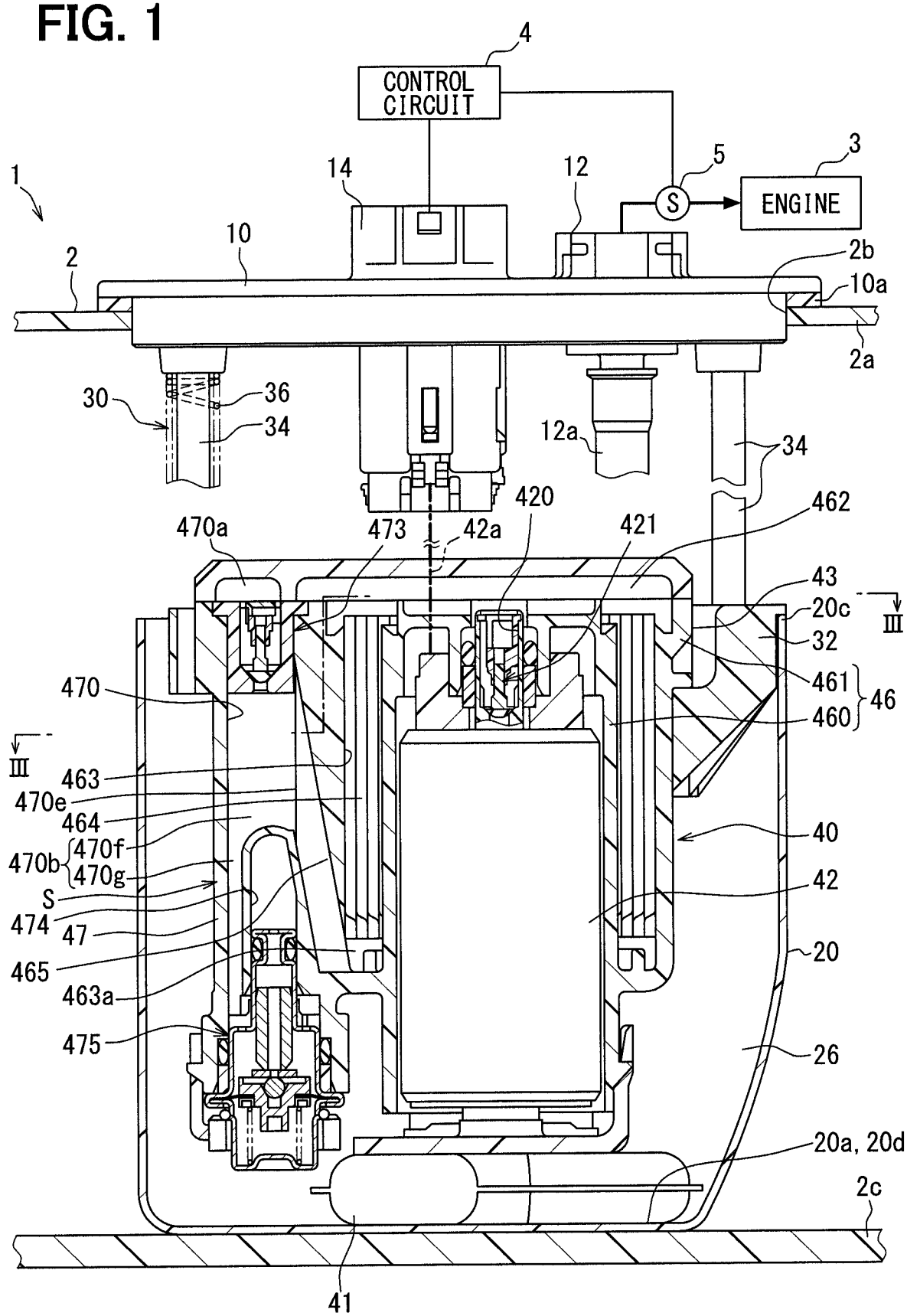
FIG. 1 is a cross sectional view taken along line I-I in FIG. 3, indicating a fuel supplying system and a relief valve according to a first embodiment.
Figure 2:
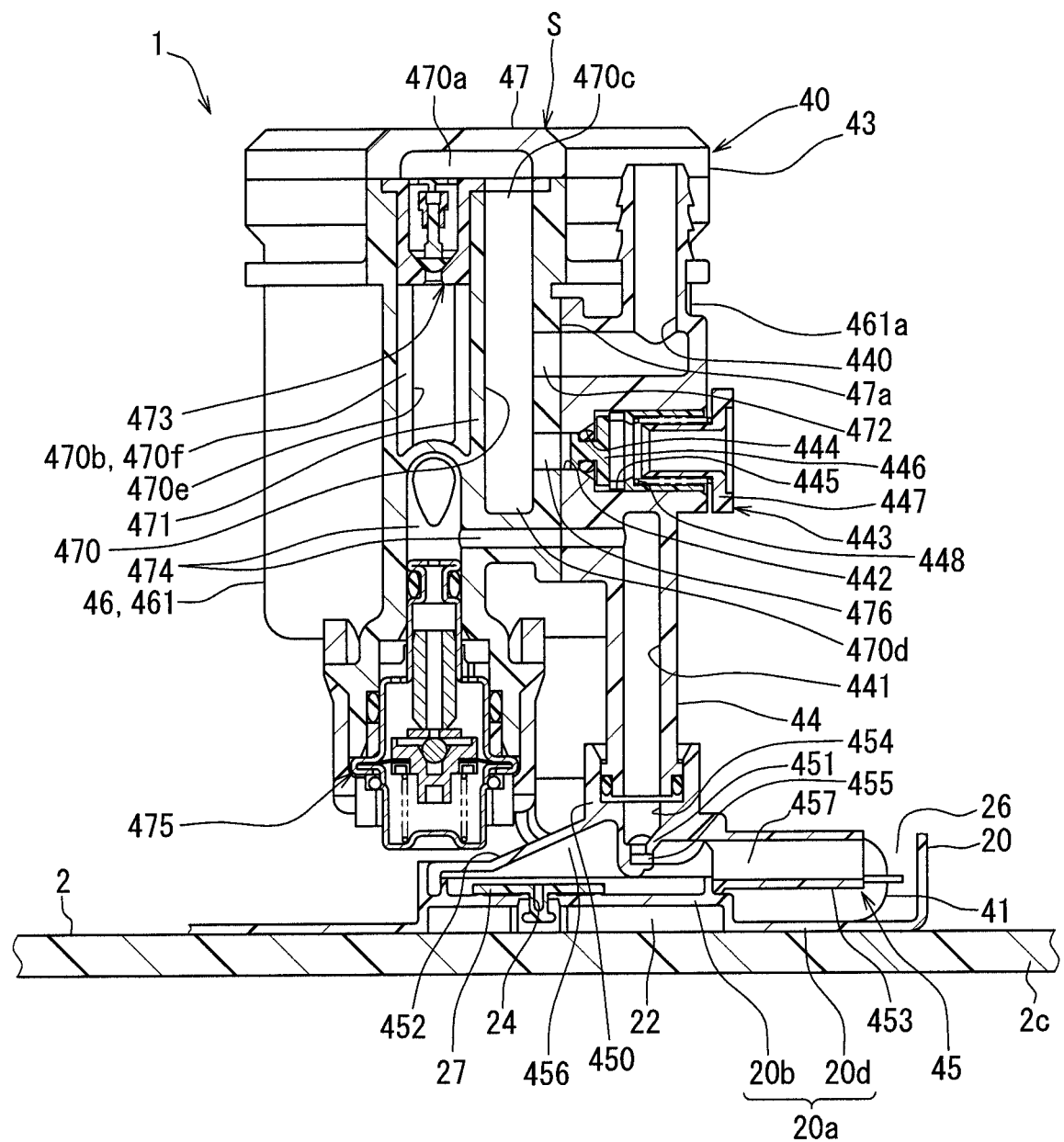
FIG. 2 is a cross sectional view taken along line II-II in FIG. 3, indicating a pump unit of FIG. 1.

As shown in FIGS. 1 and 2, a fuel supplying system 1 according to a first embodiment of the present disclosure is installed to a fuel tank 2 of a vehicle. The system 1 supplies fuel of the fuel tank 2 to fuel injection valves of an internal combustion engine 3 directly or indirectly through, for example, a high pressure pump. The fuel tank 2, which is installed in the system 1, is shaped into a hollow form and is made of resin or metal to store the fuel to be supplied to the internal combustion engine 3. Furthermore, the internal combustion engine 3, to which the fuel is supplied from the system 1, may be a gasoline engine or a diesel engine. A top-to-bottom direction of the system 1 shown in FIGS. 1 and 2 substantially coincides with a top-to-bottom direction of the vehicle placed on a horizontal plane.

(Structure and Operation)

A structure and an operation of the system 1 will be described.

As shown in FIGS. 1 to 4, the system 1 includes a flange 10, a sub-tank 20, an adjusting mechanism 30 and a pump unit 40.

As shown in FIG. 1, the flange 10 is shaped into a circular plate form and is made of resin. The flange 10 is installed to a top plate portion 2a of the fuel tank 2. The flange 10 clamps a packing 10a in corporation with the top plate portion 2a, so that the flange 10 closes a through-hole 2b that is formed in the top plate portion 2a. The flange 10 has a fuel supply pipe 12 and an electrical connector 14, which are formed integrally with the flange 10.

The fuel supply pipe 12 projects from the flange 10 toward both of an upper side and a lower side of the flange 10. The fuel supply pipe 12 is communicated with the pump unit 40 through a flexible tube 12a that is flexible. With the above communication configuration, the fuel supply pipe 12 supplies the fuel, which is pumped by a fuel pump 42 of the pump unit 40 from the inside of the fuel tank 2, toward the internal combustion engine 3 located at the outside of the fuel tank 2. The electrical connector 14 also projects from the flange 10 toward both of the upper side and the lower side of the flange 10. The electrical connector 14 electrically connects the fuel pump 42 to a control circuit 4 located at the outside. With this electrical connection, the fuel pump 42 is controlled by the control circuit 4. Here, the control circuit 4 of the present embodiment is also electrically connected to a fuel pressure sensor 5, which senses a pressure of the fuel to be supplied to the internal combustion engine 3 through the fuel supply pipe 12, to variably control the pressure of the fuel supplied to the internal combustion engine 3 through an operation of the fuel pump 42.

Figure 4:
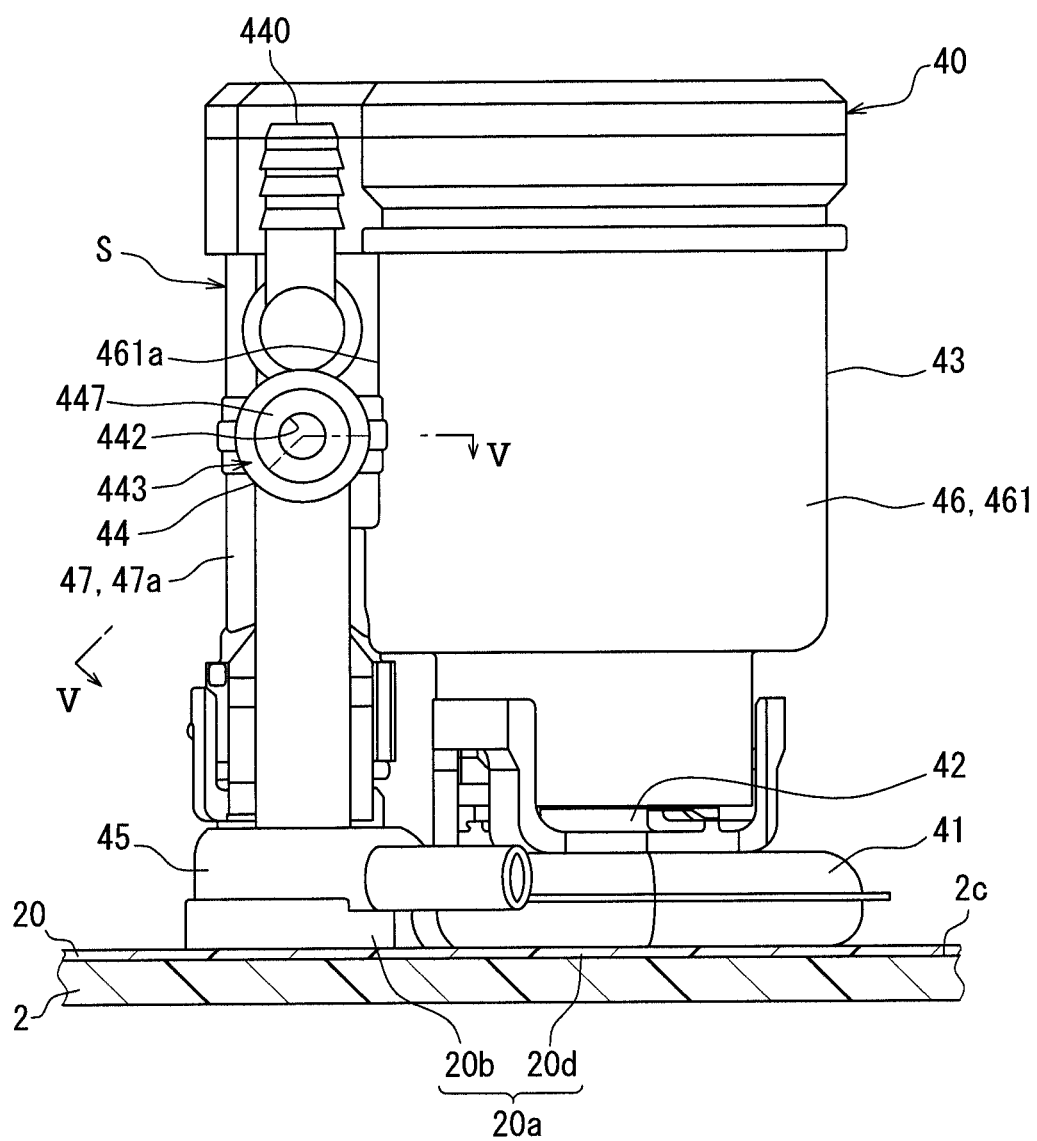
FIG. 4 is a partial cross sectional view showing the fuel supplying system and the relief valve of FIG. 1.

As shown in FIGS. 1, 2 and 4, the sub-tank 20 is shaped into a bottomed cylindrical tubular form and is made of resin. The sub-tank 20 is received in the inside of the fuel tank 2. A bottom portion 20a of the sub-tank 20 is placed on a bottom portion 2c of the fuel tank 2. Here, as shown in FIG. 2, a recessed bottom part 20b of the bottom portion 20a, which is recessed upwardly, defines an inflow space 22 between the recessed bottom part 20b and the bottom portion 2c. A flow inlet 24 is formed in the recessed bottom part 20b. The flow inlet 24 is communicated with the inside of the fuel tank 2 through the inflow space 22. With the above communication configuration, the flow inlet 24 conducts the fuel, which will be pumped by a jet pump 45 of the pump unit 40 from the fuel tank 2, into the inside of the sub-tank 20. The fuel, which is conducted into the inside of the sub-tank 20, is stored in a storage space 26 (see FIG. 1) of the sub-tank 20, which surrounds the fuel pump 42. An umbrella valve 27 is installed to the recessed bottom part 20b of the present embodiment such that the umbrella valve 27 opens the flow inlet 24 when a negative pressure is applied to the umbrella valve 27 from the jet pump 45, which will be described in detail.

As shown in FIG. 1, the adjusting mechanism 30 includes a holding member 32, a pair of support shafts 34 and an adjusting spring 36.

The holding member 32 is shaped into a circular ring form and is made of resin. The holding member 32 is installed to an upper portion 20c of the sub-tank 20 in the inside of the fuel tank 2. Each support shaft 34 is shaped into a cylindrical form and is made of metal, and the support shaft 34 is received in the inside of the fuel tank 2 and extends in the top-to-bottom direction. An upper end of each support shaft 34 is fixed to the flange 10. A portion of each support shaft 34, which is located on a lower side of the upper end of the support shaft 34, is slidably guided by the holding member 32 in a state where the support shaft 34 is inserted into the inside of the sub-tank 20. The adjusting spring 36 is in a form of a coil spring and is made of metal, and the adjusting spring 36 is received in the inside of the fuel tank 2. The adjusting spring 36 is coaxially installed around a corresponding one of the support shafts 34. The adjusting spring 36 is interposed in the top-to-bottom direction at the location between the corresponding support shaft 34 and the holding member 32. With this configuration, the adjusting spring 36 urges the bottom portion 20a of the sub-tank 20 toward the bottom portion 2c of the fuel tank 2 through the holding member 32.

As shown in FIGS. 1 to 4, the pump unit 40 is received in the fuel tank 2. The pump unit 40 includes a suction filter 41, the fuel pump 42, a filter case 43, a port member 44 and the jet pump 45.

As shown in FIGS. 1, 2 and 4, the suction filter 41 is, for example, a non-woven fabric filter and is placed on a deepest bottom part 20d, which surrounds the recessed bottom part 20b of the bottom portion 20a, in the inside of the sub-tank 20. The suction filter 41 filters the fuel to be drawn from the storage space 26 into the fuel pump 42 to remove large foreign objects contained in the fuel to be drawn into the fuel pump 42.

The fuel pump 42 is placed on the upper side of the suction filter 41 in the inside of the sub-tank 20. The fuel pump 42, which is shaped into a cylindrical form, is placed such that an axial direction of the fuel pump 42 coincides with the top-to-bottom direction. In the present embodiment, the fuel pump 42 is an electric pump. As shown in FIG. 1, the fuel pump 42 is electrically connected to the electrical connector 14 through a flexible wiring 42a that is flexible. The operation of the fuel pump 42 is controlled by the control circuit 4 through the electrical connector 14. The fuel pump 42 draws the fuel, which is accumulated in the storage space 26, through the suction filter 41, and the fuel pump 42 adjusts the pressure of the drawn fuel through adjustment of the pressurization of the fuel in the inside of the fuel pump 42.

The control circuit 4 of the present embodiment forcefully increases the pressure of the fuel, which is pumped from the fuel pump 42, at the time of performing a diagnosis operation for executing a failure diagnosis of the fuel pressure sensor 5 at a start of the operation of the internal combustion engine 3 or at an idling operation of the internal combustion engine 3 in a case where a pressure increasing condition, which corresponds to the operational state of the internal combustion engine 3, is satisfied. At this time, the pressure of the pumped fuel, which is pumped by the fuel pump 42, is adjusted to be equal to or larger than a valve opening pressure (e.g., equal to or larger than 650 kPa) of a relief valve 443 described later in detail. In a normal operation period of the fuel pump 42, during which the pressure increasing condition is not satisfied, at the time of operating the internal combustion engine 3, the pressure of the pumped fuel, which is pumped by the fuel pump 42, is variably adjusted in a range (e.g., 300 kPa to 600 kPa) that is less than the valve opening pressure of the relief valve 443. Furthermore, at the time of stopping the internal combustion engine 3, the pumping of the fuel from the fuel pump 42 is also stopped.

The fuel pump 42 has a discharge valve 421 that is integrally installed to a discharge opening 420, through which the fuel is discharged from the fuel pump 42. The discharge valve 421 is a springless check valve and is continuously opened as long as the fuel is pressurized at the time of the normal operation or the diagnosis operation of the fuel pump 42. At this valve opening time of the discharge valve 421, the fuel is pumped from the discharge opening 420 into the inside of the filter case 43. In contrast, when the pressurization of the fuel is stopped in response to the stop of the fuel pump 42, the discharge valve 421 is closed. At this valve closing time of the discharge valve 421, the pumping of the fuel into the inside of the filter case 43 is also stopped.

As shown in FIGS. 1 and 2, the filter case 43 is shaped into a hollow form and is made of resin, and the filter case 43 extends from the inside to the outside of the sub-tank 20 in the top-to-bottom direction. The filter case 43 is held by the holding member 32, so that the filter case 43 is positioned relative to the sub-tank 20.

A receiving portion 46 of the filter case 43 is shaped into a double cylindrical tubular form and is made of an inner tubular part 460 and an outer tubular part 461, and the receiving portion 46 is coaxially placed around the fuel pump 42. With this configuration of the receiving portion 46, the axial direction of the filter case 43 coincides with the top-to-bottom direction. As shown in FIG. 1, the receiving portion 46 forms a communication chamber 462 that is a planar space and is communicated with the discharge opening 420 on the upper side of the inner tubular part 460 and the outer tubular part 461.

The receiving portion 46 also forms a receiving chamber 463 that is a cylindrical space and is communicated with the communication chamber 462 at a location between the inner tubular part 460 and the outer tubular part 461. A fuel filter 464, which is shaped into a cylindrical tubular form, is received in the receiving chamber 463. The fuel filter 464 is, for example, a honeycomb filter, and filters the pressurized fuel discharged from the discharge opening 420 into the receiving chamber 463 through the communication chamber 462 to remove fine foreign objects contained in the pressurized fuel.

The receiving portion 46 also forms a relay passage 465, which is communicated with the receiving chamber 463 and is in a form of a generally rectangular hole that is tilted relative to an axial direction of the filter case 43 that coincides with the top-to-bottom direction. The relay passage 465 is communicated with a fuel outlet 463a of the receiving chamber 463 that opens on the lower side of the fuel filter 464. With this communication configuration, the relay passage 465 guides the fuel, which is filtered through the fuel filter 464 and is discharged from the fuel outlet 463a, in an obliquely upward direction.

Figure 3:
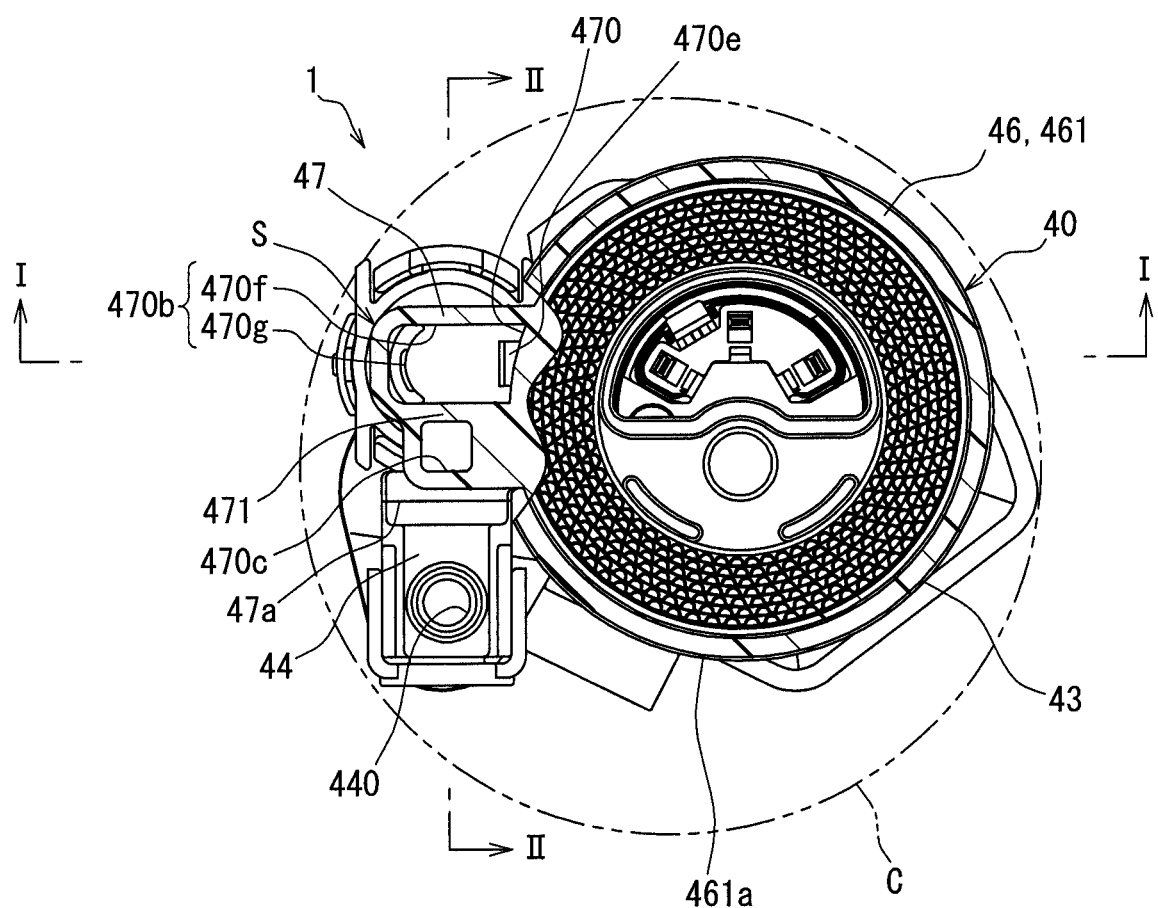
FIG. 3 is a cross sectional view taken along line in FIG. 1.

As shown in FIGS. 1 to 3, a projecting portion 47 of the filter case 43 projects from the outer tubular part 461 in a radially outward direction toward a specific circumferential location S. A fuel passage 470, a partition wall 471, a discharge passage 472, an external residual pressure holding valve 473, a branch passage 474, an internal residual pressure holding valve 475 and a relief passage 476 are placed in an inside of the projecting portion 47. In other words, the projecting portion 47 integrally has these elements 470, 471, 472, 473, 474, 475, 476 at the specific circumferential location S.

The fuel passage 470 is a space that is shaped into an inverted U-shape form in the projecting portion 47. The fuel passage 470 is partitioned by the partition wall 471 such that the fuel passage 470 makes U-turn in the axial direction of the filter case 43 that coincides with the top-to-bottom direction. With this U-turn form, the fuel passage 470 has an upstream straight part 470b and a downstream straight part 470c, and the upstream straight part 470b and the downstream straight part 470c extend downward from two ends, respectively, of a returning part 470a, which is located at the uppermost location in the fuel passage 470.

The fuel passage 470 forms a communication opening 470e that opens in an intermediate part of the upstream straight part 470b that is located in an intermediate location along the upstream straight part 470b in the top-to-bottom direction. The communication opening 470e is communicated to the receiving chamber 463 through the relay passage 465, so that the upstream straight part 470b is located on a downstream side of the fuel filter 464. With this configuration, the pressurized fuel, which is guided through the relay passage 465, is conducted from the communication opening 470e into the upstream straight part 470b. The upstream straight part 470b forms an external side passage part 470f and an internal side passage part 470g. The external side passage part 470f opens to the communication opening 470e. The internal side passage part 470g is communicated to the communication opening 470e through the external side passage part 470f.

The fuel, which is outputted from the communication opening 470e, is supplied into the external side passage part 470f shown in FIG. 1. In the external side passage part 470f, a portion of the outputted fuel, which is outputted from the communication opening 470e, is conducted to the external residual pressure holding valve 473 side, which is located on the upper side of the communication opening 470e. Furthermore, the fuel, which is branched from the fuel flow that is outputted from the communication opening 470e and is conducted to the external residual pressure holding valve 473 side, is returned toward the internal residual pressure holding valve 475 side through the external side passage part 470f and thereby flows to the internal side passage part 470g side. Here, the fuel flow, which is directed to the internal residual pressure holding valve 475 side by the internal side passage part 470g, is more restricted in comparison to the fuel flow, which is directed to the external residual pressure holding valve 473 through the external side passage part 470f.

As shown in FIG. 2, the discharge passage 472 is formed into a cylindrical form at an intermediate part of the projecting portion 47 that is located at an intermediate location along the projecting portion 47 in the top-to-bottom direction. The discharge passage 472 is branched from the downstream straight part 470c, which is located on the downstream side of the communication opening 470e and the external side passage part 470f in the fuel passage 470, in a direction that is perpendicular to the axial direction of the filter case 43. The discharge passage 472 is communicated with a discharge port 440 of the port member 44, so that the discharge passage 472 outputs the fuel of the fuel passage 470 to the internal combustion engine 3 side through the flexible tube 12a and the fuel supply pipe 12. At this time, in the fuel passage 470, the fuel, which is branched from the fuel supply flow directed to the internal combustion engine 3 through the discharge passage 472, flows on the downstream side of the discharge passage 472.

As shown in FIGS. 1 and 2, the external residual pressure holding valve 473 is a springless check valve and is located in a portion of the external side passage part 470f, which is on the downstream side of the communication opening 470e of the upstream straight part 470b and is on the upstream side of the discharge passage 472. The external residual pressure holding valve 473 opens and closes the fuel passage 470 at the external side passage part 470f. Specifically, the external residual pressure holding valve 473 is opened while the pressurized fuel is outputted from the communication opening 470e into the external side passage part 470f in response to the normal operation or the diagnosis operation of the fuel pump 42. At this valve opening time of the external residual pressure holding valve 473, the fuel, which is outputted into the external side passage part 470f, flows toward the discharge passage 472 and a downstream end 470d of the downstream straight part 470c. In contrast, when the output of the fuel from the communication opening 470e is stopped in response to the stop of the fuel pump 42, the external residual pressure holding valve 473 is closed. At this valve closing time of the external residual pressure holding valve 473, the flow of the fuel, which is directed toward the discharge passage 472 and the downstream end 470d, is also stopped. Therefore, the pressure of the fuel, which is supplied to the internal combustion engine 3 side through the output of the fuel from discharge passage 472 before the time of closing the external residual pressure holding valve 473, is maintained. That is, the external residual pressure holding valve 473 implements the residual pressure holding function for holding the pressure of the supply fuel to be supplied to the internal combustion engine 3 side through the fuel passage 470. The holding pressure, which is held by the residual pressure holding function of the external residual pressure holding valve 473, becomes a pressure that is adjusted at the time of stopping the fuel pump 42.

The branch passage 474 is in a form of a space that extends from a location, which is held between the relay passage 465 and the internal side passage part 470g in the projecting portion 47, toward the port member 44 side. The branch passage 474 is branched in a return form that returns from a lower end of the internal side passage part 470g, which is opposite from the external side passage part 470f, toward the upper side. The branch passage 474 is communicated with a jet port 441 of the port member 44, so that the branch passage 474 guides the fuel, which is discharged from the internal side passage part 470g through the internal residual pressure holding valve 475, to the jet pump 45.

The internal residual pressure holding valve 475 is a spring push type check valve and is installed in the branch passage 474. The internal residual pressure holding valve 475 opens and closes the fuel passage 470 that is communicated with the branch passage 474. Specifically, when the fuel, which has the pressure that is equal to or larger than the valve opening pressure of the internal residual pressure holding valve 475, is outputted from the communication opening 470e into the passage parts 470f, 470g in response to the normal operation or the diagnosis operation of the fuel pump 42, the internal residual pressure holding valve 475 is opened. At the valve opening time of the internal residual pressure holding valve 475, the pressurized fuel, which enters the branch passage 474, flows toward the jet pump 45. In contrast, even at the time of normal operation of the fuel pump 42, when the pressure of the fuel, which is outputted from the communication opening 470e, becomes less than the valve opening pressure of the internal residual pressure holding valve 475, or when the output of the fuel is stopped in response to the stop of the fuel pump 42, the internal residual pressure holding valve 475 is closed. At this valve closing time, the flow of the fuel toward the jet pump 45 is also stopped. Therefore, particularly in the case where the flow of the fuel toward the jet pump 45 is stopped in response to the stop of the fuel pump 42, the pressure of the receiving chamber 463 is maintained by the internal residual pressure holding valve 475 in corporation with the valve closing state of the discharge valve 421. Specifically, the internal residual pressure holding valve 475, which is in the valve closing state, implements the residual pressure holding function for holding the pressure of the residual fuel, which is present in the receiving chamber 463. The holding pressure, which is implemented by the residual pressure holding function of the internal residual pressure holding valve 475, is set to be, for example, 250 kPa.

As shown in FIG. 2, the relief passage 476 is located at an intermediate portion of the projecting portion 47 between the passage 472 and the passage 474 in the top-to-bottom direction and is in a form of a cylindrical hole. The relief passage 476 is branched from a section of the downstream straight part 470c, which is located on the downstream side of the discharge passage 472, and then the relief passage 476 extends in a direction perpendicular to the axial direction of the filter case 43. The relief passage 476 is communicated with a relief port 442 of the port member 44, so that the relief passage 476 guides the branched fuel, which is branched on the downstream side of the external residual pressure holding valve 473 from the supply flow of the fuel toward the internal combustion engine 3, to the relief valve 443.

The port member 44 is shaped into a hollow form and is made of resin. The port member 44 is placed in the inside of the sub-tank 20. As shown in FIGS. 2 to 4, the port member 44 is joined to the projecting portion 47 at the specific location S. The port member 44 protrudes from the projecting portion 47 in the direction perpendicular to the axial direction of the filter case 43. Particularly, the port member 44 of the present embodiment protrudes in a tangent direction that is tangent to a circular profile of an outer peripheral surface 461a of the outer tubular part 461, which is curved in a cylindrical form. Also, in the present embodiment, the amount of protrusion of the port member 44 is set such that an outer diameter of a circumscribed circle C (see FIG. 3), which contacts an outer peripheral surface of the filter case 43 including an outer peripheral surface of the projecting portion 47 located at the specific location S and also contacts an outer peripheral surface of the port member 44, is minimized.

The port member 44 includes the discharge port 440, the jet port 441, the relief port 442 and the relief valve 443, which are formed integrally at an outside of the filter case 43.

The discharge port 440 is in a form of an L-shape space at an upper portion of the port member 44. As shown in FIG. 2, the discharge port 440 is communicated with the discharge passage 472 that opens in an outer peripheral surface 47a of the projecting portion 47. In addition, at an opposite side of the discharge port 440, which is opposite from a communicating location of the discharge port 440 that is communicated with the discharge passage 472, a downstream end of the discharge port 440 is directed upward, so that the discharge port 440 is communicated with the flexible tube 12a (see FIG. 1). With the above described communication configuration, the discharge port 440 is communicated with the fuel passage 470 through the discharge passage 472 and is also communicated with the internal combustion engine 3 through the flexible tube 12a and the fuel supply pipe 12. With this configuration, the discharge port 440 implements a discharging effect for discharging the conducted fuel, which is conducted from the fuel passage 470 to the discharge passage 472.

The jet port 441 is in a form of an inverted L-shape space and is placed at a lower end of the port member 44, which is located on the lower side of the discharge port 440. The jet port 441 is communicated with the branch passage 474, which opens in the outer peripheral surface 47a, and the jet port 441 is also communicated with the jet pump 45 on an opposite side of the jet port 441 that is opposite from the communicating location of the jet port 441, which is communicated with the branch passage 474. With this communication configuration, the jet port 441 is communicated with the internal side passage part 470g through the branch passage 474 and is directly communicated with the jet pump 45. With this construction, the jet port 441 implements a guiding function for guiding the discharged fuel, which is discharged from the fuel passage 470 through the internal residual pressure holding valve 475, to the jet pump 45.

The relief port 442 is located in an intermediate portion of the port member 44, which is located between the port 440 and the port 441, and the relief port 442 is in a form of a stepped cylindrical hole. The relief port 442 is communicated with the relief passage 476, which opens in the outer peripheral surface 47a. In addition, the relief port 442 is communicated with the relief valve 443 at an opposite side of the relief port 442, which is opposite from a communicating location of the relief port 442 that is communicated with the relief passage 476. With this communication configuration, the relief port 442 is communicated with the fuel passage 470 through the relief passage 476 and is directly communicated with the relief valve 443. The relief port 442, which is constructed in the above described manner, implements a guiding function for guiding the branched fuel, which is branched at the fuel passage 470 from the fuel flow directed toward the internal combustion engine 3, toward the relief valve 443.

As shown in FIGS. 2 and 4 to 6, the relief valve 443 is a spring push type check valve and is installed in the relief port 442. The relief valve 443 includes an inlet portion 444, a connecting portion 445, a valve element 446, an outlet portion 447 and a valve spring 448.

Figure 5:
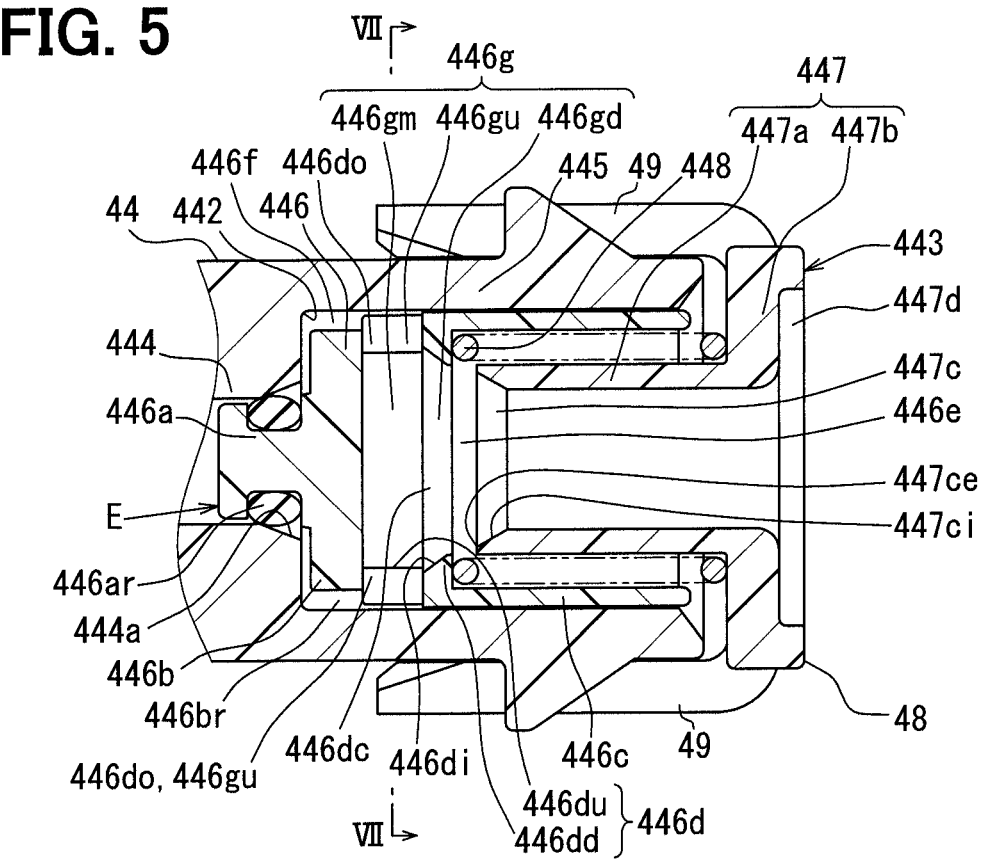
FIG. 5 is a cross sectional view taken along line V-V in FIGS. 4 and 7.
Figure 6:
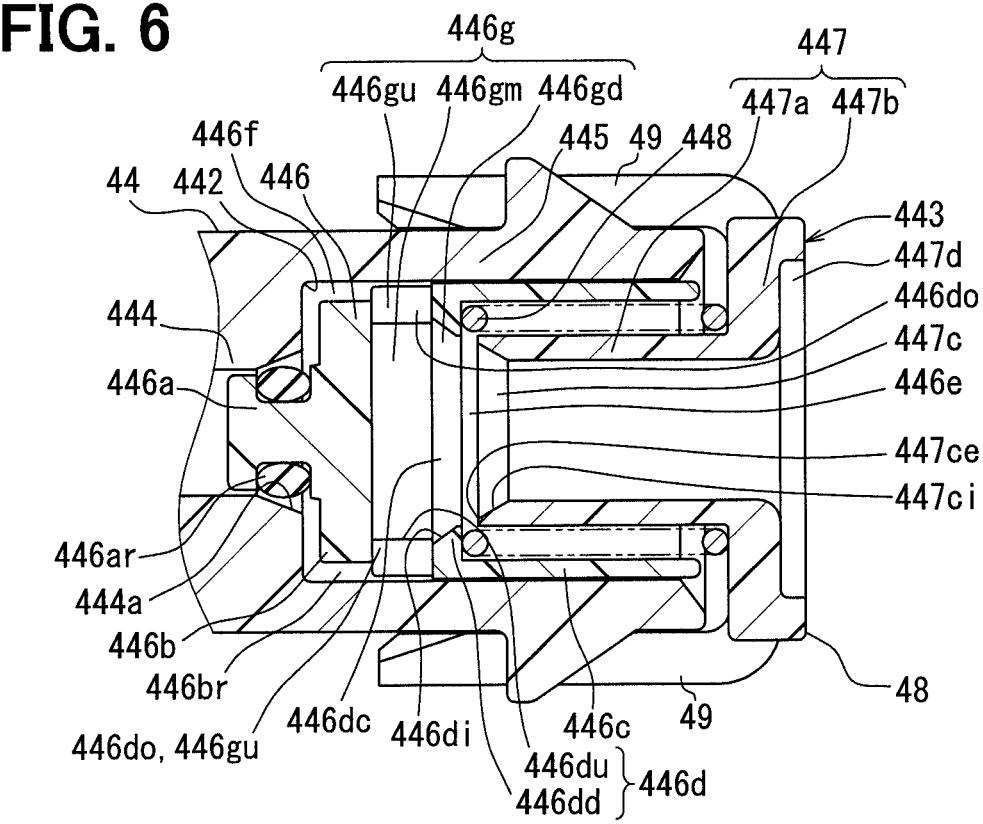
FIG. 6 is a cross sectional view showing an operational state that is different from an operational state of FIG. 5.

As shown in FIGS. 5 and 6, a wall portion of the port member 44, which forms the relief port 442, has an upstream part, and this upstream part forms the inlet portion 444. An inner peripheral surface of a downstream end part of the inlet portion 444 forms a valve seat 444a that is tapered to have a progressively decreasing inner diameter that is progressively decreased toward the upstream side. The fuel, which is branched by the relief passage 476 (see FIG. 2) from the supply flow directed to the internal combustion engine 3, flows into the inlet portion 444.

The wall portion of the port member 44, which forms the relief port 442, has a downstream part, which extends continuously from the inlet portion 444 on a downstream side of the inlet portion 444, and this downstream part forms the connecting portion 445. Thereby, the connecting portion 445 is joined to the inlet portion 444. An inner diameter of the connecting portion 445 is set to be larger than an inner diameter of a downstream end of the valve seat 444a, which is the largest inner diameter in the valve seat 444a at the inlet portion 444. The fuel, which is supplied into the inlet portion 444, can flow into an inside of the connecting portion 445.

As a whole, the valve element 446 is shaped into a bottomed cylindrical tubular form. The valve element 446 is made of resin or metal and is coaxially received in the inside of the inlet portion 444 and the inside of the connecting portion 445. The valve element 446 includes a seal portion 446a, a loosely insertable wall portion 446b, a fittable tubular portion 446c and a projecting annular portion 446d. With respect to the manufacturing, the valve element 446 of the present embodiment is formed by double-molding from resin or is formed by joining a plurality of molded resin parts or a plurality molded metal parts together.

The seal portion 446a is shaped into a cylindrical form having a groove, and the O-ring 446ar, which is made of a circular ring rubber, is held in the groove in a manner that enables integral movement of the O-ring 446ar with the seal portion 446a. The seal portion 446a is placed to extend from the inside of the inlet portion 444 to the inside of the connecting portion 445 and is reciprocatable toward the upstream side and the downstream side. When the seal portion 446a is moved to an upstream side moving end E, as shown in FIG. 5, the seal portion 446a is placed into a valve closing state, in which the O-ring 446*ar* is coaxially seated against the valve seat 444*a*. In this valve closing state, a connection between the inlet portion 444 and the connecting portion 445 is blocked with the seal portion 446*a*, so that the fuel does not flow from the inside of the inlet portion 444 into the inside of the connecting portion 445. In contrast, when the seal portion 446*a* is moved from the moving end E toward the downstream side, as shown in FIG. 6, the seal portion 446*a* is placed into a valve opening state, in which the O-ring 446*ar* is lifted from the valve seat 444*a*. In this valve opening state, the inlet portion 444 and the connecting portion 445 are communicated with each other, so that the fuel flows from the inside of the inlet portion 444 into the inside of the connecting portion 445.

As shown in FIGS. 5 and 6, the loosely insertable wall portion 446*b* is shaped into a circular disk form that extends continuously from the seal portion 446*a* toward the downstream side. An outer diameter of the loosely insertable wall portion 446*b* is set to be smaller than an inner diameter of the connecting portion 445. The loosely insertable wall portion 446*b* is coaxially and loosely inserted in the inside of the connecting portion 445 on the downstream side of the valve seat 444*a*, so that the loosely insertable wall portion 446*b* is reciprocatable toward the upstream side and the downstream side. A radial gap 446*br* is formed between the loosely insertable wall portion 446*b* and the connecting portion 445 such that the radial gap 446*br* extends continuously along an entire circumferential extent of the loosely insertable wall portion 446*b*, and the radial gap 446*br* forms a first communication passage 446*f*, which is in a form of an annular space. In the valve closing state shown in FIG. 5, the first communication passage 446*f* is blocked from the inside of the inlet portion 444 by the seal portion 446*a*. In contrast, in the valve opening state shown in FIG. 6, the first communication passage 446*f* is communicated with the inside of the inlet portion 444.

Figure 7:
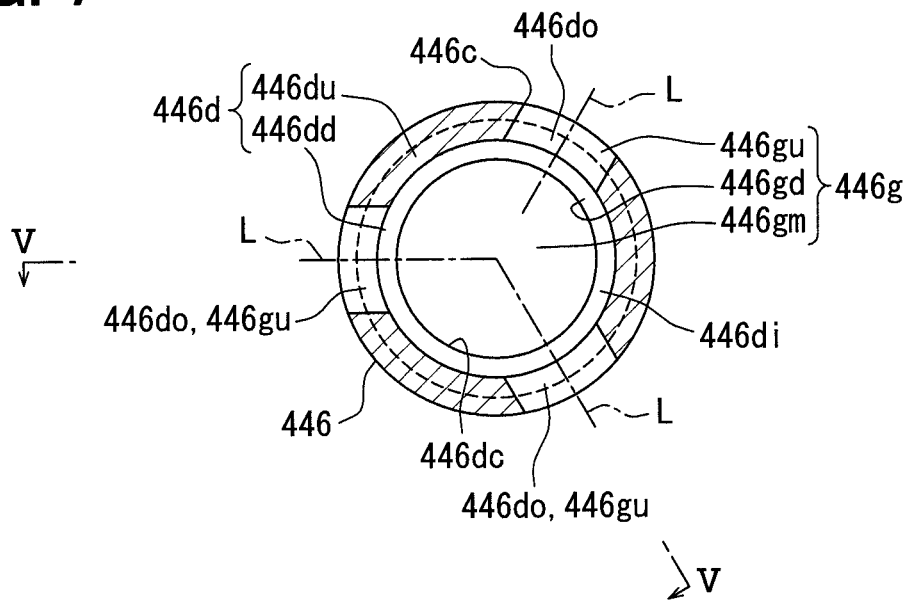
FIG. 7 is a cross sectional view taken along line VII-VII in FIG. 5.

As shown in FIGS. 5 to 7, the fittable tubular portion 446*c* is shaped into a cylindrical tubular form and extends from the loosely insertable wall portion 446*b* toward the downstream side. An outer diameter of the fittable tubular portion 446*c* is set to be larger than the outer diameter of the loosely insertable wall portion 446*b* within a range that is slightly smaller than the inner diameter of the connecting portion 445. The fittable tubular portion 446*c* is coaxially fitted into the inside of the connecting portion 445 on the downstream side of the loosely insertable wall portion 446*b*, so that the fittable tubular portion 446*c* is slidably supported by the connecting portion 445 in a manner that enables reciprocation of the fittable tubular portion 446*c* toward the upstream side and the downstream side. Here, at a slide boundary surface between the fittable tubular portion 446*c* and the connecting portion 445, effluent of the fuel from the first communication passage 446*f* toward the downstream side is limited (see FIG. 8).

The projecting annular portion 446*d* is formed at a location, which extends continuously from the loosely insertable wall portion 446*b* toward the downstream side, and the projecting annular portion 446*d* is shaped into a circular ring plate form that projects from the fittable tubular portion 446*c* toward the radially inner side. The projecting annular portion 446*d*, which has an axial length that is shorter than that of the fittable tubular portion 446*c*, is coaxially placed in the inside of the connecting portion 445, which supports the fittable tubular portion 446*c* from a radially outer side of the fittable tubular portion 446*c*. As shown in FIGS. 5 to 7, a plurality of circumferential parts of an upstream part 446*du* of the projecting annular portion 446*d* are cut together with corresponding parts of the fittable tubular portion 446*c* located on a radially outer side of the upstream part 446*du*, so that a plurality of opening windows 446*do* is formed between the upstream part 446*du* and the loosely insertable wall portion 446*b*. In contrast, a downstream part 446*dd* of the projecting annular portion 446*d* continuously extends in the circumferential direction. An inner peripheral surface 446*di* of a through-hole 446*dc*, which extends through the downstream part 446*dd* of the projecting annular portion 446*d*, is tapered such that an inner diameter of the inner peripheral surface 446*di* is progressively decreased toward the downstream side. The projecting annular portion 446*d*, which is constructed in the above described manner, is reciprocatable toward the upstream side and the downstream side in the inside of the connecting portion 445 while maintaining a positional relationship of the projecting annular portion 446*d* relative to the loosely insertable wall portion 446*b* and the fittable tubular portion 446*c*.

In the projecting annular portion 446*d*, the opening windows 446*do*, which are located between the projecting annular portion 446*d* and the loosely insertable wall portion 446*b* on the upstream side of the projecting annular portion 446*d*, form a plurality of upstream side passage parts 446*gu*. In the present embodiment, the opening windows 446*do* are respectively formed at three locations, which are arranged one after another at equal intervals in the circumferential direction, so that the upstream side passage parts 446*gu* are located along different radial lines L, respectively, as shown in FIG. 7. Furthermore, as shown in FIGS. 5 to 7, the projecting annular portion 446*d* has a through-hole 446*dc*, which is located on a radially inner side of the downstream part 446*dd*. The through-hole 446*dc* forms a downstream side passage part 446*gd*, which is in a form of a circular truncated cone space and has a progressively decreasing inner diameter that is progressively decreased toward the downstream side. Furthermore, at a location, which is on a radially inner side of the respective upstream side passage parts 446*gu* and is on an upstream side of the downstream side passage part 446*gd*, an intermediate passage part 446*gm* is formed by a space that communicates between each upstream side passage part 446*gu* and the downstream side passage part 446*gd*.

When the respective upstream side passage parts 446*gu*, the downstream side passage part 446*gd* and the intermediate passage part 446*gm* shown in FIGS. 5 to 8 cooperate together, a second communication passage 446*g* is formed such that the second communication passage 446*g* extends from a location, which is communicated with the first communication passage 446*f* and is located between the loosely insertable wall portion 446*b* and the projecting annular portion 446*d*, to the radially inner side of the projecting annular portion 446*d*. In the present embodiment, an axial width of each opening window 446*do* and a minimum inner diameter of the through-hole 446*dc* are set to be larger than a radial width of the radial gap 446*br*. Thereby, a passage cross sectional area of the second communication passage 446*g* is increased in comparison to a passage cross sectional area of the first communication passage 446*f*.

As shown in FIGS. 5 and 6, the outlet portion 447 is formed by a retainer 48 that is shaped into a stepped cylindrical tubular form and is made of resin. The retainer 48 is installed to the relief port 442 through a pair of clips 49, so that the outlet portion 447 is connected to the connecting portion 445. The outlet portion 447 includes a small diameter part 447a and a large diameter part 447b, which are coaxial with each other and are formed integrally as a one piece body.

The small diameter part 447a is coaxially inserted into the inside of the connecting portion 445 from a downstream end of the connecting portion 445 to a location, which is on the upstream side of the downstream end of the connecting portion 445 but is apart from the projecting annular portion 446d located on the upstream side of this location. An outer diameter of the small diameter part 447a is set to be smaller than an inner diameter of the fittable tubular portion 446c. Regardless of the moving positions of the projecting annular portion 446d and the fittable tubular portion 446c, the small diameter part 447a, which is inserted in the above-described manner and has the above-described outer diameter setting, can maintain the inserted state of the small diameter part 447a, which is inserted into the radially inner side of the fittable tubular portion 446c on the downstream side of the projecting annular portion 446d.

With this inserted state of the small diameter part 447a, a communication opening 447c of the small diameter part 447a, which opens toward the upstream side, is communicated with the downstream side passage part 446gd of the second communication passage 446g through an inner peripheral side space 446e of the fittable tubular portion 446c. An inner peripheral surface 447ci of the communication opening 447c is tapered such that an inner diameter of the inner peripheral surface 447ci is progressively decreased toward the downstream side. An upstream end 447ce of the communication opening 447c, which has a largest inner diameter in the communication opening 447c due to the tapering, is located on a radially inner side of the inner peripheral surface 446di of the projecting annular portion 446d along an entire circumferential extent of the upstream end 447ce of the communication opening 447c.

The large diameter part 447b is formed continuously from the small diameter part 447a on the downstream side of the small diameter part 447a and is placed at an outside of the connecting portion 445. A relief opening 447d of the large diameter part 447b, which opens toward the downstream side, is communicated with the storage space 26 (see FIGS. 1 and 2), which is located at an outside of the outlet portion 447. Thus, in the valve closing state shown in FIG. 5, the fuel flow, which is directed from the inside of the inlet portion 444 to the passages 446f, 446g and the outlet portion 447, is blocked between the inlet portion 444 and the passage 446f. Thus, the fuel is not discharged from the inlet portion 444. In contrast, in the valve opening state shown in FIG. 6, the inlet portion 444 and the passage 446f are communicated with each other, and thereby the fuel flow, which is directed from the inside of the inlet portion 444 to the passages 446f, 446g and the outlet portion 447, is enabled. Thus, the fuel is discharged from the large diameter part 447b at the downstream end of the outlet portion 447 into the storage space 26 located at the outside of the outlet portion 447.

As shown in FIGS. 5 and 6, the valve spring 448, which serves as a resilient member, is in a form of a coil spring and is made of metal. The valve spring 448 is coaxially received in the inside of the connecting portion 445. The valve spring 448 is coaxially placed around an outer peripheral surface of the small diameter part 447a of the outlet portion 447, so that the valve spring 448 is guided along the small diameter part 447a while forming a minute gap between the valve spring 448 and the small diameter part 447a. Furthermore, the valve spring 448 is also guided by the fittable tubular portion 446c regardless of the moving position of the fittable tubular portion 446c while forming a minute gap between the valve spring 448 and the fittable tubular portion 446c. Under this guide configuration, an upstream end of the valve spring 448 is engaged to the projecting annular portion 446d, which is located on the upstream side of the upstream end of the valve spring 448, and a downstream end of the valve spring 448 is engaged to the large diameter part 447b, which is located on the downstream side of the downstream end of the valve spring 448. With this engagement configuration, the valve spring 448, which is clamped in a compressed state between the projecting annular portion 446d and the large diameter part 447b, urges the valve element 446 toward the valve seat 444a located on the upstream side.

With the structure described above, the relief valve 443 opens and closes the fuel passage 470, which is communicated with the relief port 442 through the relief passage 476, as shown in FIG. 2. Specifically, even in the normal operation time or the stop time of the fuel pump 42, as long as the fuel pressure on the upstream side of the relief port 442 is kept less than the valve opening pressure of the relief valve 443 by maintaining the normal state of the fuel supply path, which extends from the fuel passage 470 to the internal combustion engine 3, the relief valve 443 is closed. At this valve closing time of the relief valve 443, the fuel, the pressure of which is adjusted by the fuel pump 42, is discharged through the discharge passage 472 and the discharge port 440. Therefore, the pressure of the supply fuel, which is supplied toward the internal combustion engine 3, is kept to be substantially equal to a pressure regulating value of the fuel pump 42. In contrast, even in the normal operation time or the stop time of the fuel pump 42, when the fuel, which has the pressure that is equal to or larger than the valve opening pressure of the relief valve 443, is guided to the upstream side of the relief port 442 upon occurrence of an abnormality in the fuel supply path, which extends from the fuel passage 470 to the internal combustion engine 3, the relief valve 443 is opened. Similarly, at the diagnosis operation time of the fuel pump 42 upon satisfaction of the pressure increasing condition, the fuel, which has the pressure that is equal to or larger than the valve opening pressure of the relief valve 443, is guided to the upstream side of the relief port 442, so that the relief valve 443 is opened. At the valve opening time in a corresponding one of the above described states, the fuel, which flows into the inlet portion 444 that forms the upstream end of the relief valve 443, is outputted to the storage space 26 in the sub-tank 20, so that the pressure of the supply fuel to be supplied to the internal combustion engine 3 is released. That is, the relief function is implemented for the supply fuel to be supplied to the internal combustion engine 3 by the relief valve 443, which is opened. The valve opening pressure of the relief valve 443 for implementing the relief function is set to, for example, 650 kPa, as discussed above.

As shown in FIG. 2, the jet pump 45 is shaped into a hollow form and is made of resin, and the jet pump 45 is placed on the lower side of the port member 44 in the sub-tank 20. The jet pump 45 is placed on particularly the recessed bottom part 20b of the bottom portion 20a of the sub-tank 20. The jet pump 45 includes a pressurizing portion 450, a nozzle portion 451, a suctioning portion 452 and a diffuser portion 453, which are formed integrally as a one piece body.

The pressurizing portion 450 forms a pressurizing passage 454 in a form of a stepped cylindrical hole that extends in the axial direction of the filter case 43. The pressurizing passage 454 is located on the lower side of the port member 44 and is communicated with the jet port 441. The nozzle portion 451 forms a nozzle passage 455 in a form of a cylindrical hole that extends in a direction that is perpendicular to the axial direction of the filter case 43. The nozzle passage 455 is located on the lower side of the pressurizing portion 450 and is communicated with the pressurizing passage 454. With the above described construction, the pressurized fuel, which is outputted from the internal side passage part 470g through the internal residual pressure holding valve 475, is guided to the pressurizing passage 454 and the nozzle passage 455 in this order through the jet port 441.

The suctioning portion 452 forms a suction passage 456 in a form of a planar space that extends in the direction perpendicular to the axial direction of the filter case 43. The suction passage 456 is communicated with the flow inlet 24 located on the lower side of the pressurizing portion 450 and the nozzle portion 451. The diffuser portion 453 forms a diffuser passage 457 in a form of a cylindrical hole that extends in the direction perpendicular to the axial direction of the filter case 43. The diffuser passage 457 is located on the lower side of the pressurizing portion 450 and is communicated with the nozzle passage 455 and is also communicated with the storage space 26 on the opposite side of the diffuser passage 457, which is opposite from the communicating location of the diffuser passage 457 that is communicated with the nozzle passage 455. With the above described construction, when the pressurized fuel, which flows into the nozzle passage 455, is discharged into the diffuser passage 457 to generate a negative pressure around the discharged flow of the pressurized fuel, the fuel in the fuel tank 2 is suctioned from the flow inlet 24 through the suction passage 456 and the diffuser passage 457 in this order. The fuel, which is suctioned in this way, is pumped upon receiving the diffuser action through the diffuser passage 457 and is thereby transferred to the storage space 26.

Now, advantages of the first embodiment discussed above will be described.

Figure 8:
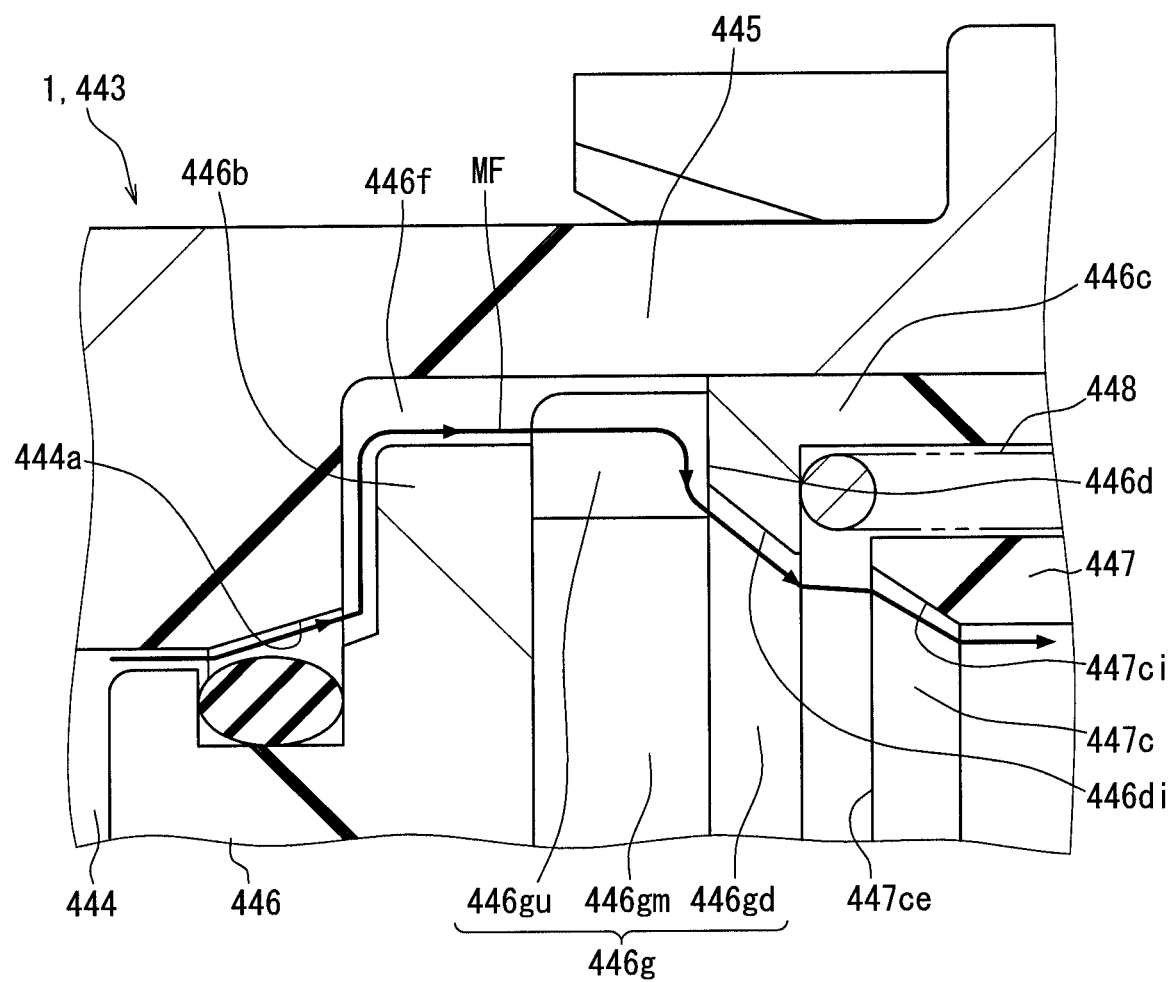
FIG. 8 is a cross sectional view for describing a main flow as a fuel flow in the operational state of FIG. 6.

According to the first embodiment, in the valve element 446, which is in the valve opening state, the loosely insertable wall portion 446b, which is loosely fitted into the connecting portion 445 on the downstream side of the valve seat 444a, enables communication of the first communication passage 446f, which is located between the loosely insertable wall portion 446b and the connecting portion 445, to the inside of the inlet portion 444. At this time, on the downstream side of the loosely insertable wall portion 446b, the projecting annular portion 446d, which projects radially inward from the fittable tubular portion 446c that is inserted into the connecting portion 445 and is slidably supported in the connecting portion 445, forms the second communication passage 446g that is communicated with the first communication passage 446f. Thereby, as shown in FIG. 8, a main flow MF, which has a high flow speed and is bent from the first communication passage 446f toward the radially inner side, is generated as a flow of the fuel at a location between the loosely insertable wall portion 446b and the projecting annular portion 446d in the second communication passage 446g. Furthermore, at this time, the inside of the outlet portion 447, which projects into the fittable tubular portion 446c on the radially inner side of the fittable tubular portion 446c, is communicated with the second communication passage 446g on the downstream side of the projecting annular portion 446d. Thereby, the main flow MF, which has the high flow speed and is bent in the above-described manner, is rectified and flows from the second communication passage 446g, which is located on the radially inner side of the projecting annular portion 446d, toward the outlet portion 447. Thus, the main flow MF will less likely become a swirl flow. Furthermore, the valve spring 448, which is located on the radially outer side of the outlet portion 447 and on the radially inner side of the fittable tubular portion 446c and is engaged with the projecting annular portion 446d on the upstream side of the valve spring 448, is displaced from the main flow MF, which has the high flow speed and is directed toward the inside of the outlet portion 447. Therefore, the vapor, which is carried by the main flow MF, will less likely collide against the valve spring 448.

As described above, in the relief valve 443 as well as the system 1 having the relief valve 443 according to the first embodiment, it is possible to limit generation of the pulsation of the fuel, which would be caused by chattering of the valve element 446, and it is also possible to limit generation of vibration of the valve spring 448. Thus, it is possible to reduce the noise, which would be caused by the pulsation and the vibration discussed above.

Furthermore, according to the first embodiment, in the case where the pressure increasing condition, which corresponds to the operational state of the internal combustion engine 3, is satisfied, the fuel, which is outputted from the fuel pump 42, is forcefully pressurized to a pressure that is equal to or lager than the valve opening pressure of the valve element 446. Thereby, the valve element 446 is opened and is thereby placed into the valve opening state. At this time, the generation of the pulsation in the fuel, which is caused by the chattering of the valve element 446, and the vibration of the valve spring 448 are both limited because of the above-described principle. Thereby, it is possible to avoid the generation of the noise, which is caused by the pulsation and the vibration every time the pressure increasing condition is satisfied.

Furthermore, according to the first embodiment, in the second communication passage 446g, which has an increased passage cross sectional area for conducting the fuel in comparison to the first communication passage 446f, it is possible to reduce the pressure loss of the main flow MF that is supplied from the first communication passage 446f. Therefore, the flow speed of the main flow MF, which is directed from the second communication passage 446g toward the inside of the outlet portion 447, can be kept high, and thereby it is possible to limit generation of the swirl flow in the main flow MF. Thus, it is possible to improve the reducing effect for reducing the noise, which is caused by the fuel pulsation that is in turn caused by the chattering of the valve element 446.

Furthermore, according to the first embodiment, the main flow MF is conducted through the second communication passage 446g located on the radially inner side of the projecting annular portion 446d and is directed to the communication opening 447c of the outlet portion 447 that is communicated with the second communication passage 446g. At this time, the fuel of the main flow MF can easily enter the upstream end 447ce that is located on the radially inner side of the projecting annular portion 446d and has the largest inner diameter in the communication opening 447c that has the progressively decreasing inner diameter that is progressively reduced toward the downstream side. Furthermore, the main flow MF, which has the high flows speed, is guided along the inner peripheral surface 447ci of the communication opening 447c having the progressively decreasing inner diameter in a manner shown in FIG. 8, so that the main flow MF is smoothly rectified, and thereby it is possible to improve the limiting function for limiting the generation of the swirl flow. Therefore, it is possible to further improve the reducing effect for reducing the noise, which is caused by the fuel pulsation that is in turn caused by the chattering of the valve element 446.

In addition, according to the first embodiment, in the second communication passage 446g, the upstream side passage parts 446gu, which are located between the loosely insertable wall portion 446b and the projecting annular portion 446d, are placed along the different radial lines L, respectively, which are different from each other. Thereby, the main flow MF, which flows from the first communication passage 446f into the respective upstream side passage parts 446gu, is not easily outputted through another one of the upstream side passage parts 446gu located along another one of the radial lines L. Therefore, the flow of the main flow MF can be easily directed toward the inner peripheral side of the projecting annular portion 446d (the downstream side passage part 446gd), which is located on the downstream side of the respective upstream side passage parts 446gu in the second communication passage 446g. In this way, it is possible to reliably increase the component of the main flow MF, which can have the limiting effect for limiting the generation of the swirl flow that is implemented by the high flow speed of the main flow MF directed from the radially inner side into the inside of the outlet portion 447. Thus, it is possible to further improve the reducing effect for reducing the noise, which is caused by the fuel pulsation that is in turn caused by the chattering of the valve element 446.

In addition, according to the first embodiment, the valve spring 448 is guided by both of the outlet portion 447 and the fittable tubular portion 446c, so that the orientation of the valve spring 448 is stabilized. Thereby, in addition to the effect of limiting the collision of the vapor against the valve spring 448, the vibration of the valve spring 448 is further limited. Thus, it is possible to improve the reducing effect for reducing the noise caused by the vibration of the valve spring 448.

Furthermore, according to the first embodiment, in the second communication passage 446g, the downstream side passage part 446gd, which is located on the radially inner side of the projecting annular portion 446d, has the progressively decreasing inner diameter that is progressively decreased toward the downstream side. Accordingly, the main flow MF, which is directed from the downstream side passage part 446gd to the inside of the outlet portion 447 and has the high flow speed, is guided along the inner peripheral surface 446di of the projecting annular portion 446d, which has the progressively decreasing inner diameter that is progressively decreased toward the downstream side, as shown in FIG. 8. Therefore, the main flow MF is smoothly rectified, and thereby it is possible to improve the liming effect for limiting the generation of the swirl flow. Thus, it is possible to further improve the reducing effect for reducing the noise, which is caused by the fuel pulsation that is in turn caused by the chattering of the valve element 446.

Second Embodiment

Figure 9:
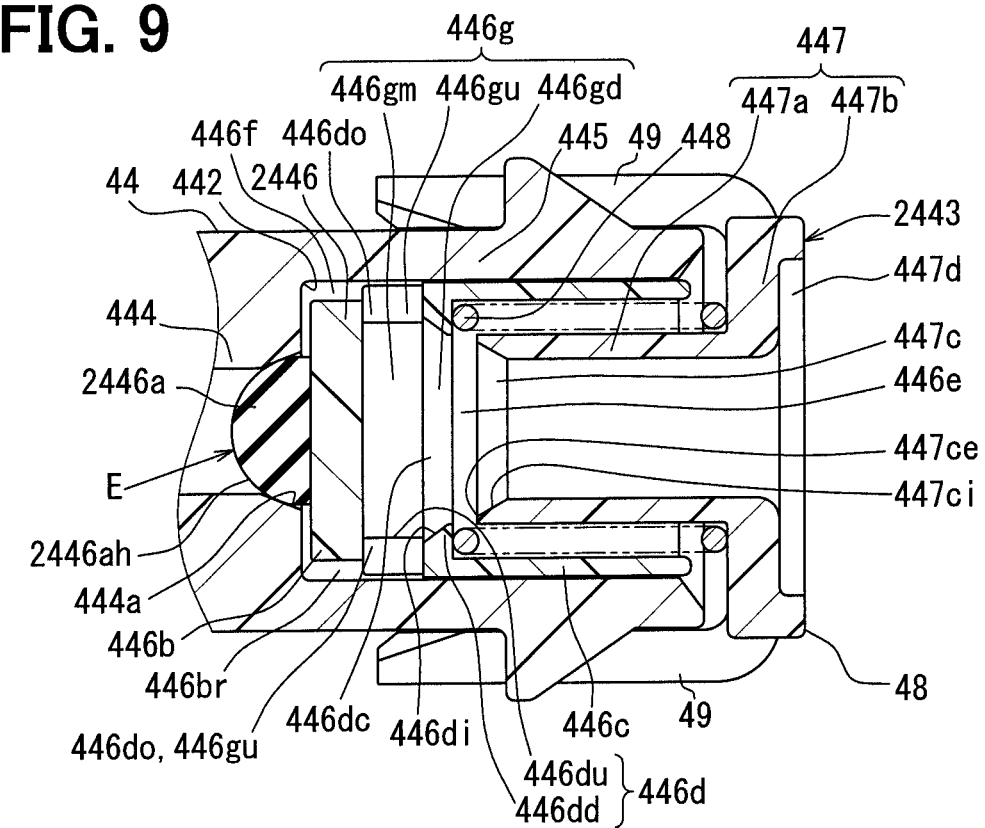
FIG. 9 is a cross sectional view that corresponds to FIG. 5, indicating a fuel supplying system and a relief valve according to a second embodiment.
Figure 10:
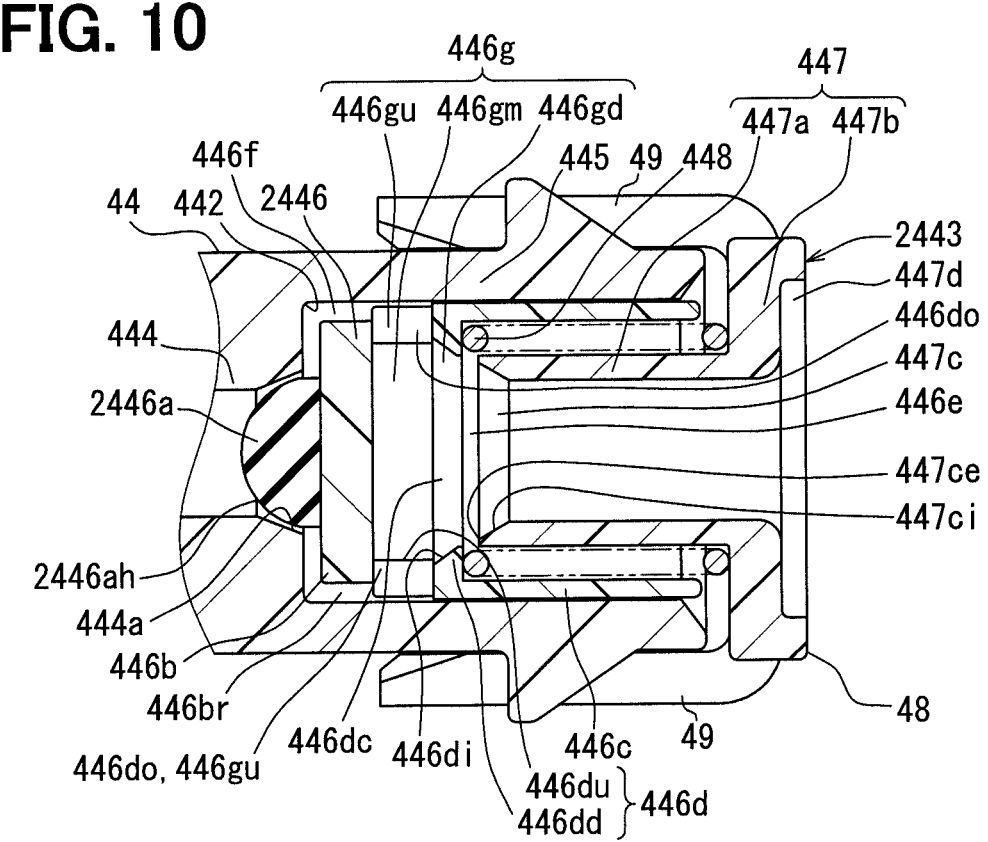
FIG. 10 is a cross sectional view that corresponds to FIG. 6, indicating the fuel supplying system and the relief valve according to the second embodiment.

As shown in FIGS. 9 and 10, a second embodiment is a modification of the first embodiment. In the relief valve 2443 of the second embodiment, a seal portion 2446a of the valve element 2446 is shaped into a generally semispherical form and is made of rubber. The seal portion 2446a is coaxially fixed to an upstream side part of the loosely insertable wall portion 446b. The seal portion 2446a is placed to extend from the inside of the inlet portion 444 to the inside of the connecting portion 445 and is reciprocatable toward the upstream side and the downstream side.

In the second embodiment, as shown in FIG. 9, when the seal portion 2446a is moved to the upstream side moving end E, the seal portion 2446a is placed into the valve closing state, in which a semispherical surface part 2446ah of the seal portion 2446a is coaxially seated against the valve seat 444a. In this valve closing state, at the location between the inlet portion 444 and the passage 446f, the seal portion 2446a blocks the fuel flow from the inside of the inlet portion 444 into insides of the passages 446f, 446g and the outlet portion 447. Thus, the fuel is not outputted from the inside of the inlet portion 444. In contrast, as shown in FIG. 10, when the seal portion 2446a is moved to the downstream side of the moving end E, the seal portion 2446a is placed into the valve opening state, in which the semispherical surface part 2446ah is lifted away from the valve seat 444a. In this valve opening state, the inlet portion 444 and the passage 446f are communicated with each other, and thereby the flow of the fuel from the inside of the inlet portion 444 into the insides of the passages 446f, 446g and the outlet portion 447 is enabled. Thus, the fuel is outputted from the inside of the large diameter part 447b, which is located at the downstream end, into the storage space 26 located at the outside.

Thus, according to the second embodiment, which has the same structure as that of the first embodiment except the above described feature, advantages, which are similar to those of the first embodiment, can be achieved.

Third Embodiment

Figure 11:
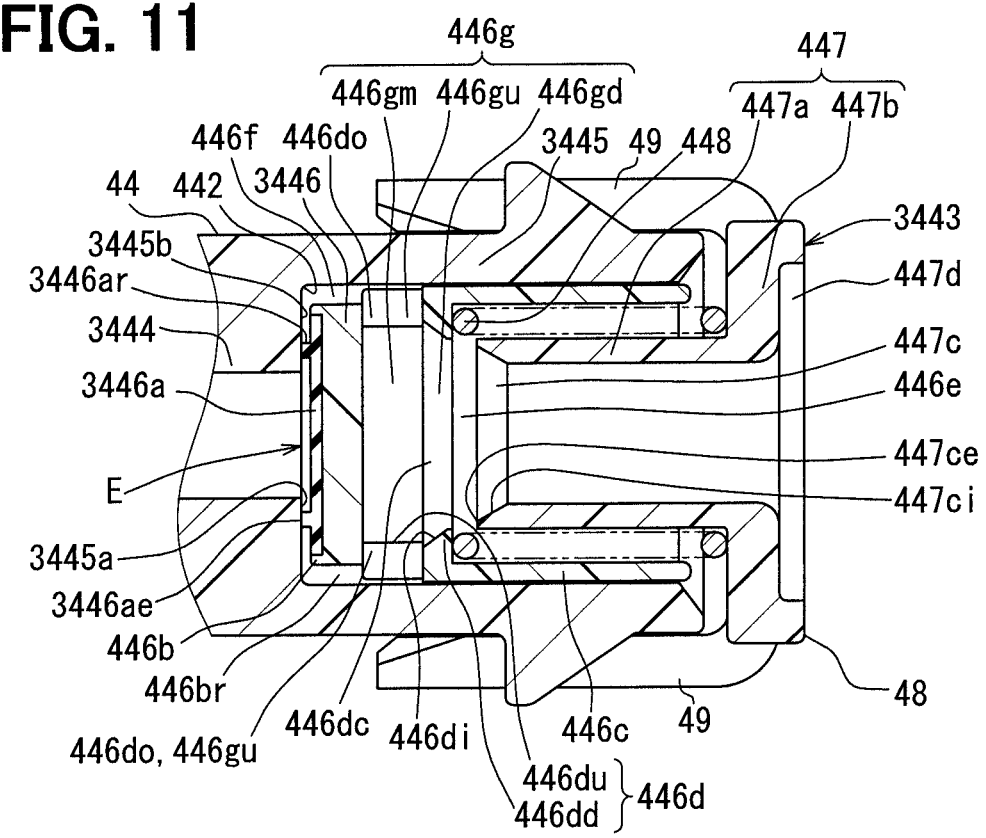
FIG. 11 is a cross sectional view that corresponds to FIG. 5, indicating a fuel supplying system and a relief valve according to a third embodiment.
Figure 12:
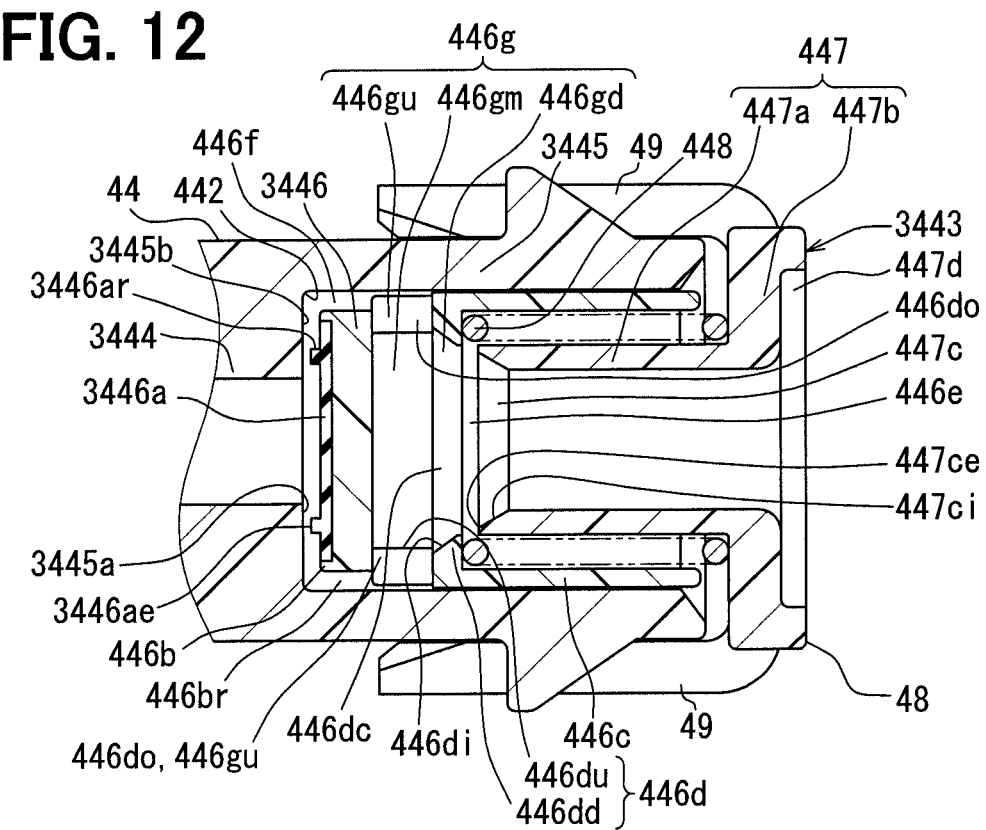
FIG. 12 is a cross sectional view that corresponds to FIG. 6, indicating the fuel supplying system and the relief valve according to the third embodiment.

As shown in FIGS. 11 and 12, a third embodiment is a modification of the first embodiment. In the relief valve 3443 of the third embodiment, the valve seat 3445a is formed in the connecting portion 3445 instead of the inlet portion 3444. The valve seat 3445a is formed by a step surface 3445b, which is located at an upstream end of the connecting portion 3445 and connects between the upstream end of the connecting portion 3445 and a downstream end of the inlet portion 3444.

In the relief valve 3443 of the third embodiment, the seal portion 3446a of the valve element 3446 is shaped into a circular plate form and is made of rubber. The seal portion 3446a is coaxially fixed to an upstream side part of the loosely insertable wall portion 446b. The seal portion 3446a is opposed to the step surface 3445b in the connecting portion 3445, which is placed on the downstream side of the inlet portion 3444, and the seal portion 3446a is reciprocatable toward the upstream side and the downstream side. The seal portion 3446a includes a ridge 3446ar that is in a form of a circular ring and projects toward the step surface 3445b, which is located on the upstream side.

In the third embodiment, as shown in FIG. 11, when the seal portion 3446a is moved to the upstream side moving end E, the seal portion 3446a is placed into the valve closing state, in which a planar end surface part 3446ae of the ridge 3446ar is coaxially seated against the valve seat 3445a. In the valve closing state, at the location between the inlet portion 3444 and the passage 446f, the seal portion 3446a blocks the flow of the fuel from the inside of the inlet portion 3444 to the insides of the passages 446f, 446g and the outlet portion 447. Thus, the fuel is not outputted from the inside of the inlet portion 444 into the storage space 26 through the inside of the large diameter part 447b. In contrast, as shown in FIG. 12, when the seal portion 3446a is moved to the downstream side of the moving end E, the seal portion 3446a is placed into the valve opening state, in which the planar end surface part 3446ae is lifted away from the valve seat 3445a. In this valve opening state, the inlet portion 3444 and the passage 446f are communicated with each other, and thereby the flow of the fuel from the inside of the inlet portion 3444 into the insides of the passages 446f, 446g and the outlet portion 447 is enabled. Thus, the fuel is outputted from the inside of the large diameter part 447b, which is located at the downstream end, into the storage space 26 located at the outside.

Thus, according to the third embodiment, which has the same structure as that of the first embodiment except the above described feature, advantages, which are similar to those of the first embodiment, can be achieved.

Fourth Embodiment

Figure 13:
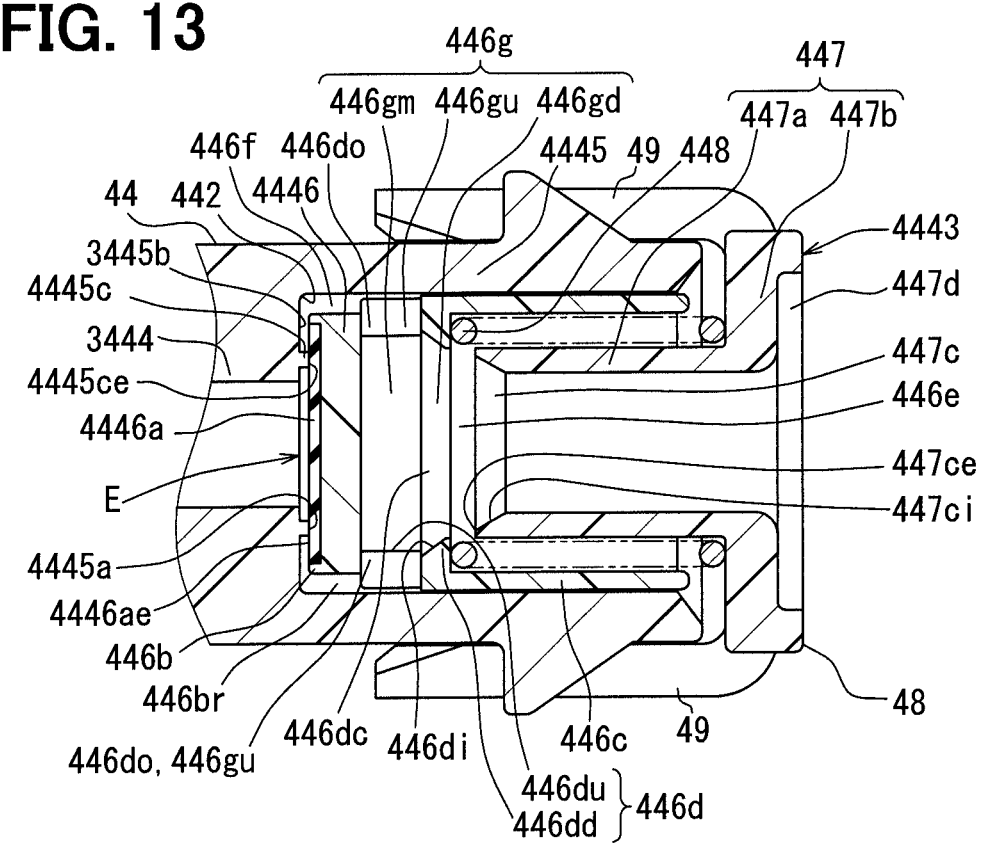
FIG. 13 is a cross sectional view that corresponds to FIG. 5, indicating a fuel supplying system and a relief valve according to a fourth embodiment.
Figure 14:
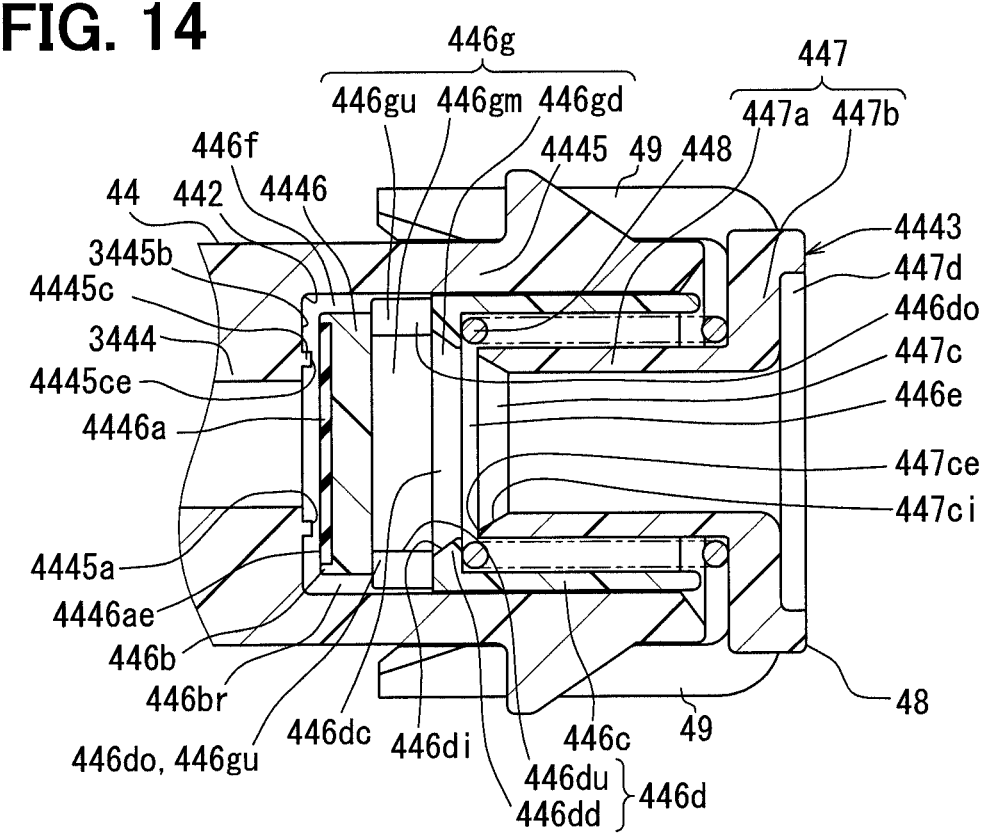
FIG. 14 is a cross sectional view that corresponds to FIG. 6, indicating the fuel supplying system and the relief valve according to the fourth embodiment.

As shown in FIGS. 13 and 14, a fourth embodiment is a modification of the third embodiment. In the relief valve 4443 of the fourth embodiment, the valve seat 4445a is formed by a planar end surface part 4445ce of a ridge 4445c, which is in a form of a circular ring and projects from the step surface 3445b of the connecting portion 4445 toward the downstream side.

In the relief valve 4443 of the fourth embodiment, the seal portion 4446a of the valve element 4446 is in a form of a circular plate and is made of rubber. The seal portion 4446a is coaxially fixed to the upstream side part of the loosely insertable wall portion 446b. The seal portion 4446a is opposed to the step surface 3445b in the connecting portion 4445, which is placed on the downstream side of the inlet portion 3444, and the seal portion 4446a is reciprocatable toward the upstream side and the downstream side.

In the fourth embodiment, as shown in FIG. 13, when the seal portion 4446a is moved to the upstream side moving end E, the seal portion 4446a is placed into the valve closing state, in which a planar end surface part 4446ae of the seal portion 4446a is coaxially seated against the valve seat 4445a. In the valve closing state, at the location between the inlet portion 3444 and the passage 446f, the seal portion 4446a blocks the flow of the fuel from the inside of the inlet portion 3444 to the insides of the passages 446f, 446g and the outlet portion 447. Thus, the fuel is not outputted from the inside of the inlet portion 444 into the storage space 26 through the inside of the large diameter part 447b. In contrast, as shown in FIG. 14, when the seal portion 4446a is moved to the downstream side of the moving end E, the seal portion 4446a is placed into the valve opening state, in which the planar end surface part 4446ae is lifted away from the valve seat 4445a. In this valve opening state, the inlet portion 3444 and the passage 446f are communicated with each other, and thereby the flow of the fuel from the inside of the inlet portion 3444 into the insides of the passages 446f, 446g and the outlet portion 447 is enabled. Thus, the fuel is outputted from the inside of the large diameter part 447b, which is located at the downstream end, into the storage space 26 located at the outside.

Thus, according to the fourth embodiment, which has the same structure as that of the first or third embodiment except the above described feature, advantages, which are similar to those of the first embodiment, can be achieved.

OTHER EMBODIMENTS

The various embodiments of the present disclosure have been described. However, the present disclosure should not be limited to these embodiments and may be applied to various other embodiments as well as combinations of the embodiments within a scope of the present disclosure.

Specifically, in a first modification, a condition, which is other than the start condition of the internal combustion engine 3 for starting the failure diagnosis of the fuel pressure sensor 5 or the idling operation condition, may be used as the pressure increasing condition for forcefully increasing the pressure of the pumped fuel outputted from the fuel pump 42. Furthermore, in a second modification, the operation of the fuel pump 42, which is executed in the case of satisfaction of the pressure increasing condition, such as the diagnosis operation for forcefully increasing the pressure of the pumped fuel outputted from the fuel pump 42, may be omitted.

In a third modification, a passage cross sectional area of a portion of the second communication passage 446g may be set to be substantially equal to a passage cross sectional area of the first communication passage 446f. In a fourth modification, a passage cross sectional area of a portion of the second communication passage 446g may be set to be smaller than the passage cross sectional area of the first communication passage 446f.

Figure 15:
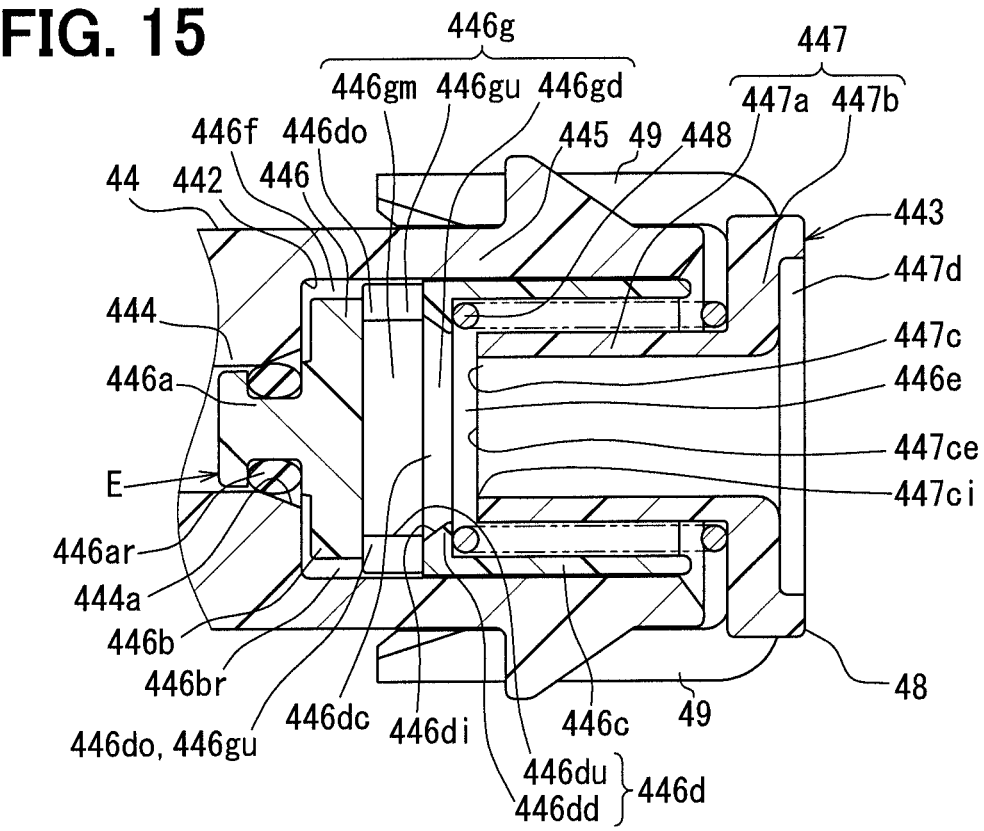
FIG. 15 is a cross sectional view indicating a modification of FIG. 5.

As shown in FIG. 15, in a fifth modification, the communication opening 447c may be shaped into a straight form, in which the diameter is not progressively decreased toward the downstream side. In a sixth modification, the upstream end 447ce of the communication opening 447c may be placed on the radially outer side of the inner peripheral surface 446di of the projecting annular portion 446d.

Figure 16:
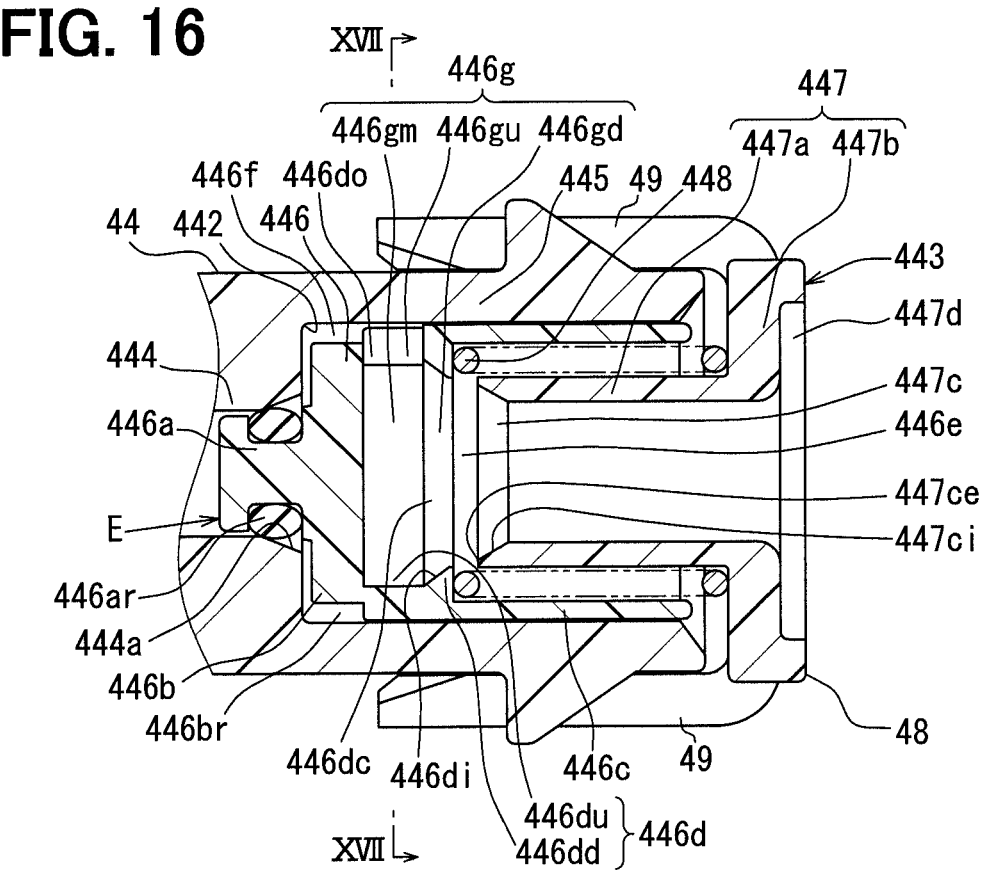
FIG. 16 is a cross sectional view taken along line XVI-XVI in FIG. 17 indicating a modification of FIG. 5.
Figure 17:
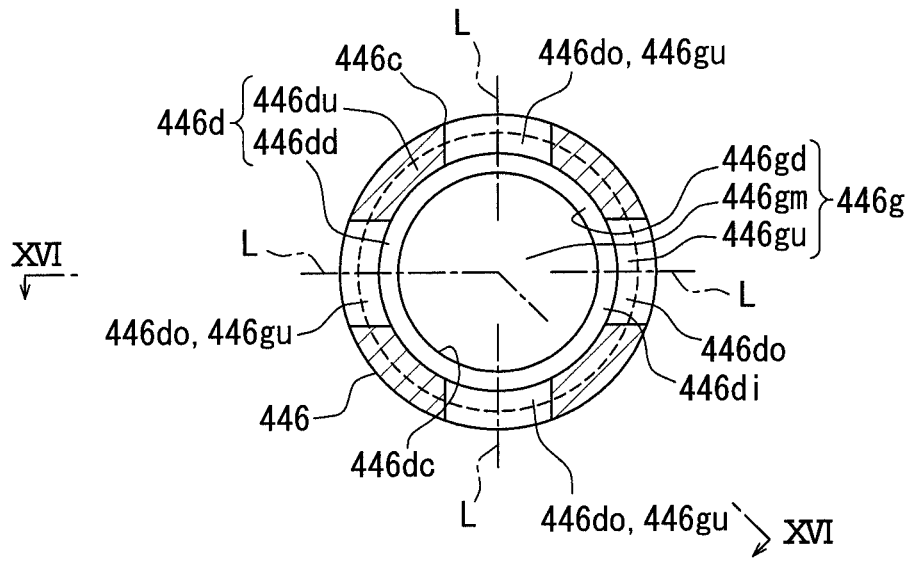
FIG. 17 is a cross sectional view taken along line XVII-XVII in FIG. 16 indicating a modification of FIG. 7.

As shown in FIGS. 16 and 17, in a seventh modification, each corresponding two of the upstream side passage parts 446gu, which are located between the loosely insertable wall portion 446b and the projecting annular portion 446d in the second communication passage 446g, may be placed along a corresponding common radial line L. In an eighth modification, the number of the upstream side passage parts 446gu, which are located between the loosely insertable wall portion 446b and the projecting annular portion 446d in the second communication passage 446g, may be set to one or any other number that is other than three (FIGS. 16 and 17 show an example where the number of the upstream side passage parts 446gu is four).

Figure 18:
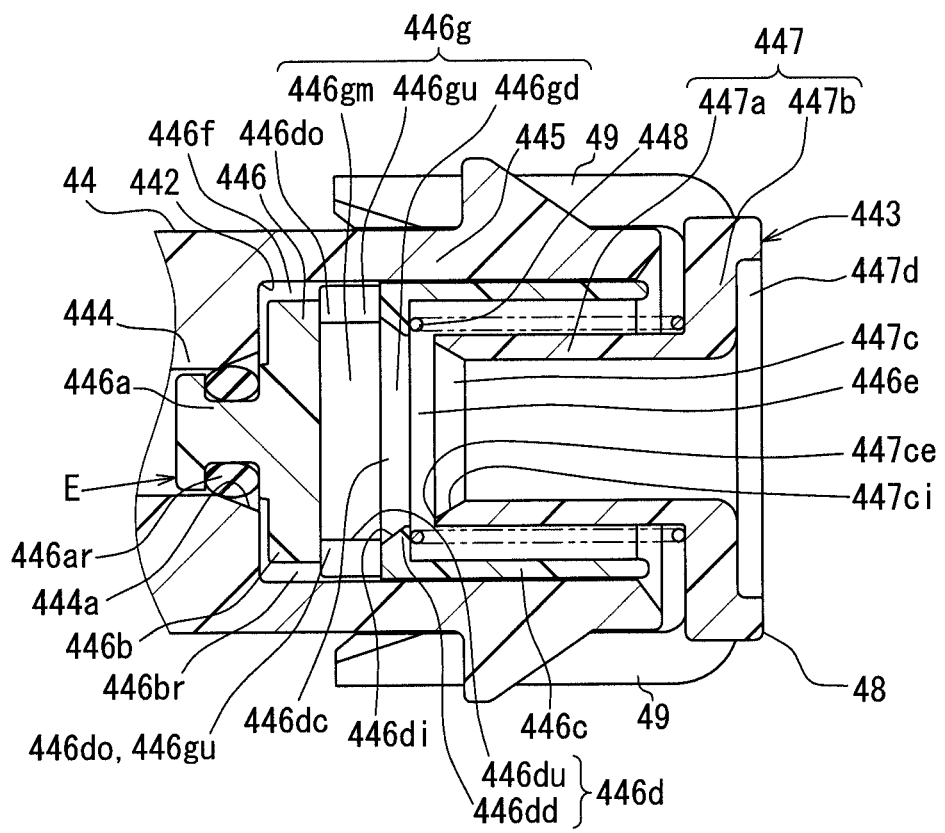
FIG. 18 is a cross sectional view indicating a modification of FIG. 5.
Figure 19:
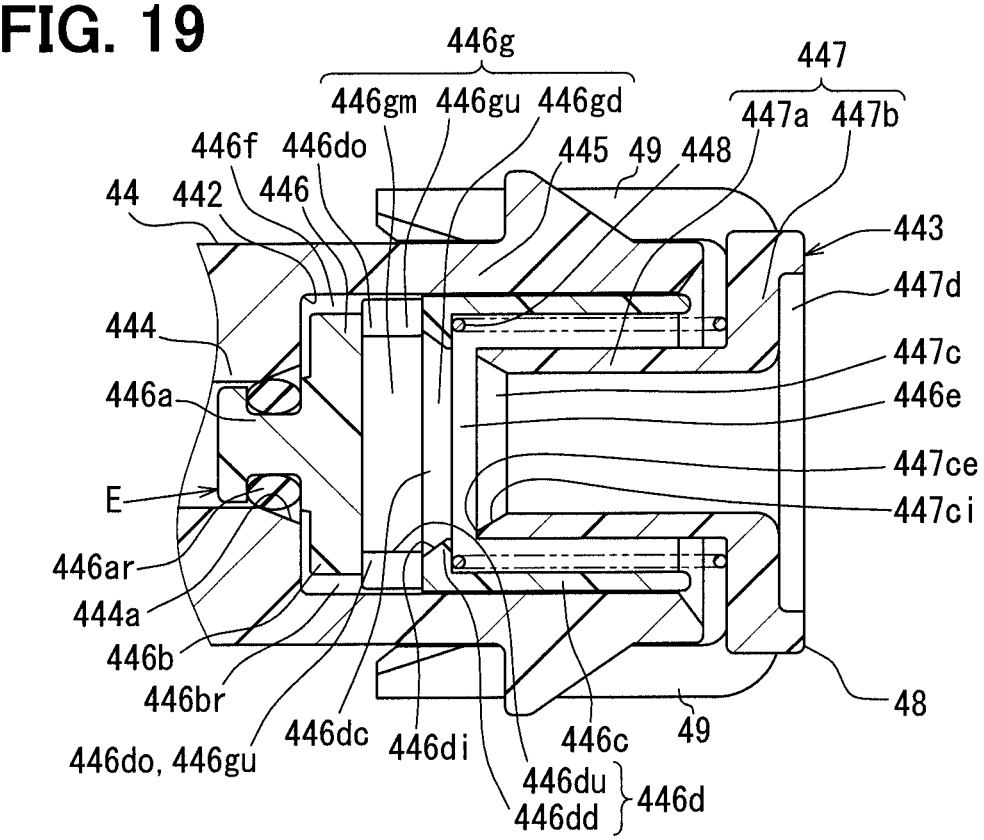
FIG. 19 is a cross sectional view indicating a modification of FIG. 5.

As shown in FIG. 18, in a ninth modification, the valve spring 448 may be largely spaced from the fittable tubular portion 446c toward the radially inner side, so that the valve spring 448 is not substantially guided by the fittable tubular portion 446c. Furthermore, as shown in FIG. 19, in a tenth modification, the valve spring 448, which is guided by the fittable tubular portion 446c, may be largely spaced from the outlet portion 447 toward the radially outer side, so that the valve spring 448 is not substantially guided by the outlet portion 447. Furthermore, in an eleventh modification, the valve spring 448 may be largely spaced from the fittable tubular portion 446c toward the radially inner side and may be largely spaced from the outlet portion 447 toward the radially outer side, so that the valve spring 448 is not substantially guided by the fittable tubular portion 446c and the outlet portion 447.

Figure 20:
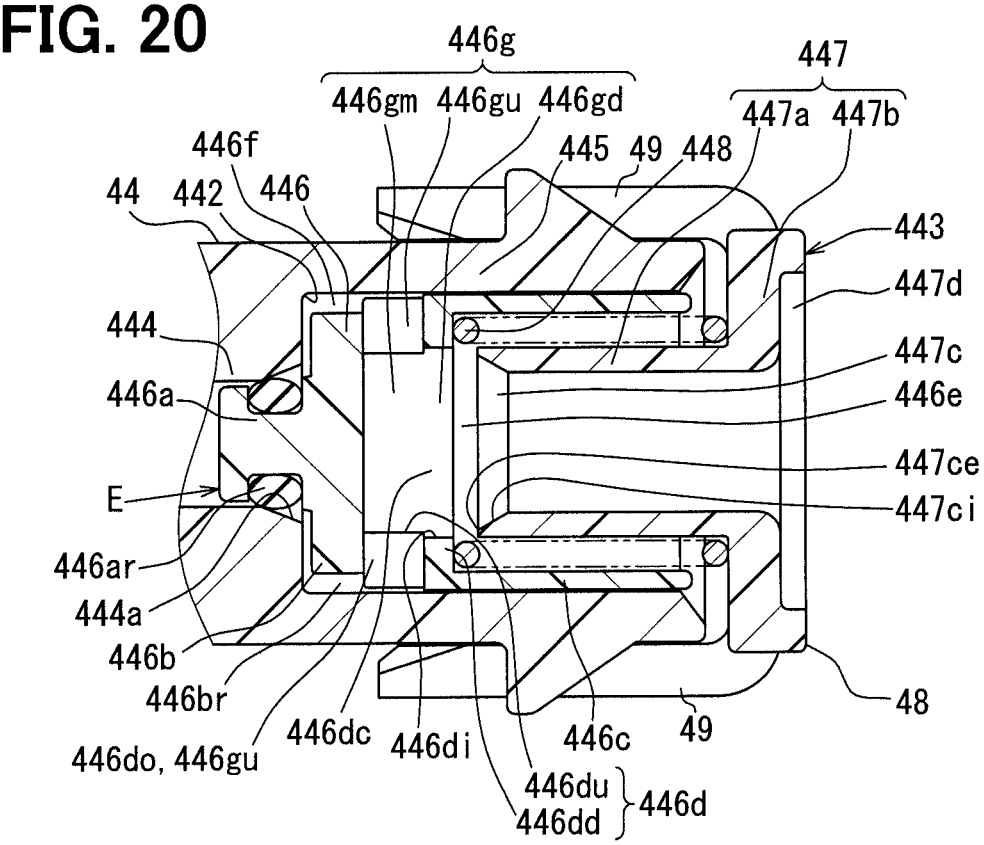
FIG. 20 is a cross sectional view indicating a modification of FIG. 5.

As shown in FIG. 20, in a twelfth modification, the downstream side passage part 446gd of the second communication passage 446g, which is located on the radially inner side of the projecting annular portion 446d, may be shaped into a form, which has a diameter that does not decrease toward the downstream side and which may be, for example, a straight form shown in FIG. 20. In such a case, for example, in the first embodiment, the valve element 446 may be formed by a single molded resin product or a single molded metal product.

In a thirteenth modification, the seal portion 446a, which is made of the resin and at which the O-ring 446ar is not installed, or the seal portion 2446a, 3446a, 4446a, which is made of the resin and has the surface part 2446ah, 3446ae, 4446ae, may be seated and lifted relative to the valve seat 444a of the inlet portion 444 made of the resin or the valve seat 3445a, 4445a of the connecting portion 3445, 4445 made of the resin. In a fourteenth modification, the seal portion 446a, which is made of the metal and at which the O-ring 446ar is not installed, or the seal portion 2446a, 3446a, 4446a, which is made of the metal and has the surface part 2446ah, 3446ae, 4446ae, may be seated and lifted relative to the valve seat 444a of the inlet portion 444 made of the metal or the valve seat 3445a, 4445a of the connecting portion 3445, 4445 made of the metal.

Besides the above modifications, in a fifteenth modification, the present disclosure may be applied to a fuel supplying system, in which a portion of the pump unit 40, such as the relief valve 443, 2443, 3443, 4443 of the pump unit 40, is placed at the outside of the fuel tank 2.

The invention claimed is:

1. A relief valve for a fuel supplying system that pumps fuel from a fuel pump to supply the fuel toward an internal combustion engine, wherein the relief valve releases a pressure of supply fuel, which is directed to the internal combustion engine, to an outside, the relief valve comprising:
   an inlet portion that receives the fuel, which is branched from a supply flow of the fuel directed to the internal combustion engine;
   an outlet portion that outputs the fuel, which is inputted into the inlet portion, to the outside;
   a connecting portion that is connected to the inlet portion and the outlet portion;
   a valve element that is reciprocatable toward both of an upstream side and a downstream side in an inside of the connecting portion, wherein:
      the valve element blocks a fuel flow from an inside of the inlet portion to an inside of the outlet portion in a valve closing state, in which the valve element is seated against a valve seat formed in the inlet portion or the connecting portion; and
      the valve element enables the fuel flow from the inside of the inlet portion to the inside of the outlet portion in a valve opening state, in which the valve element is lifted from the valve seat; and
   a resilient member that is received in the inside of the connecting portion and urges the valve element toward the valve seat, which is located on an upstream side of the valve element, wherein:
   the valve element includes:
      a loosely insertable wall portion that is loosely inserted in the inside of the connecting portion on a downstream side of the valve seat and communicates a first communication passage, which is formed between the loosely insertable wall portion and the connecting portion, to the inside of the inlet portion in the valve opening state;
      a fittable tubular portion that is fitted to the inside of the connecting portion on a downstream side of the loosely insertable wall portion and is slidably supported by the connecting portion; and
      a projecting annular portion that projects from the fittable tubular portion toward a radially inner side of the fittable tubular portion, so that a second communication passage, which is communicated with the first communication passage, is formed by the projecting annular portion to extend from a location between the projecting annular portion and the loosely insertable wall portion to a radially inner side of the projecting annular portion;
   the loosely insertable wall portion, the fittable tubular portion and the projecting annular portion of the valve element are integrally reciprocatable relative to the inlet portion, the outlet portion and the connecting portion toward both of the upstream side and the downstream side;
   the outlet portion projects into the fittable tubular portion on the radially inner side of the fittable tubular portion at a location on a downstream side of the projecting annular portion, so that the outlet portion is communicated with the second communication passage;
   the resilient member is located on a radially outer side of the outlet portion and on the radially inner side of the fittable tubular portion and is engaged to the projecting annular portion located on an upstream side of the resilient member;
   the resilient member is interposed between the outlet portion and the fittable tubular portion in a radial direction;
   the loosely insertable wall portion, the fittable tubular portion and the projecting annular portion of the valve element are joined together, and
   the loosely insertable wall portion, the fittable tubular portion and the projecting annular portion of the valve element are formed integrally in one piece.

2. The relief valve according to claim 1, wherein the fuel, which is pumped from the fuel pump, is forcefully pressurized to a pressure that is equal to or larger than a valve opening pressure of the valve element, at which the valve element is opened, in a case where a pressure increasing condition, which corresponds to an operational state of the internal combustion engine, is satisfied.

3. The relief valve according to claim 1, wherein the second communication passage increases a fuel passage cross-sectional area in comparison to the first communication passage.

4. The relief valve according to claim 1, wherein:
   the outlet portion forms a communication opening that has a progressively decreasing inner diameter, which is progressively decreased toward the downstream side, and the communication opening is communicated with the second communication passage; and
   an upstream end of the communication opening is placed on the radially inner side of the projecting annular portion.

5. The relief valve according to claim 1, wherein in the second communication passage, a plurality of upstream side passage parts, which are located between the loosely insertable wall portion and the projecting annular portion, is formed along a plurality of radial lines, respectively, which are different from each other.

6. The relief valve according to claim 1, wherein the resilient member is guided by at least one of the outlet portion and the fittable tubular portion.

7. The relief valve according to claim 1, wherein in the second communication passage, a downstream side passage part, which is located on the radially inner side of the projecting annular portion, has a progressively decreasing inner diameter that is progressively decreased toward the downstream side.

8. A fuel supplying system that supplies fuel toward an internal combustion engine, the fuel supplying system comprising:

a fuel pump that pumps supply fuel toward the internal combustion engine; and the relief valve of claim 1, which releases a pressure of the supply fuel, which is directed to the internal combustion engine, to the outside.

\* \* \* \* \*